United States Patent [19]

Card et al.

[11] 3,828,316

[45] Aug. 6, 1974

[54] CHARACTER ADDRESSING IN A WORD ORIENTED COMPUTER SYSTEM

[75] Inventors: Charles D. Card, Warrington, Pa.; John R. Crane, Minneapolis, Minn.

[73] Assignee: Sperry Rand Corporation, New York, N.Y.

[22] Filed: May 30, 1973

[21] Appl. No.: 365,373

[52] U.S. Cl. .............................................. 340/172.5
[51] Int. Cl. ...... G06f 13/00, G06f 3/00, G11c 7/00
[58] Field of Search .................................. 340/172.5

[56] References Cited

UNITED STATES PATENTS

| | | | |
|---|---|---|---|
| 3,331,056 | 7/1967 | Lethin et al. | 340/172.5 |
| 3,602,896 | 8/1971 | Zeheb | 340/172.5 |
| 3,716,838 | 2/1973 | Lemessurierbisard | 340/172.5 |
| 3,731,283 | 5/1973 | Carlson et al. | 340/172.5 |

*Primary Examiner*—Paul J. Henon
*Assistant Examiner*—James D. Thomas
*Attorney, Agent, or Firm*—Thomas J. Nikolai; Kenneth T. Grace; John P. Dority

[57] ABSTRACT

A character addressing system in a word-oriented computer system is described. A programmable system for selecting characters in a word-oriented computer system, wherein the size of each character can be selected, and the character positioned for character manipulation or computation is shown. The system provides for utilizing instructions in a program coded in a relative address format, and further provides for a separate bank or portion of memory for the storage of operands and the like having separate relative addressing relationships. As the addresses are called out in the operating program, the character addressing system operates first to compute in parallel a pair of alternative absolute addresses, and then operates to select the appropriate absolute address for accessing the memory. Once the computer word is accessed and read out of the memory, the appropriate character is selected from within the accessed word, and is justified to a position adjacent the binary point. The system provides for selective sign extension when required. The character addressing system of this invention also positions characters that are to be written in memory to an appropriate position within the word-oriented format, and causes the positioned character to be written in the memory. The character addressing system also provides control circuitry for sequentially incrementing or decrementing successive characters whereby sequences of characters can be manipulated by the computer system.

21 Claims, 24 Drawing Figures

INSTRUCTION STREAM (APPROXIMATE TIMING)

OPERAND ADDRESS GENERATION

COMMAND ARITHMETIC UNIT FUNCTIONAL BLOCK DIAGRAM

| REGISTER | ADDRESS (OCTAL) | |
|---|---|---|
| | USER | EXECUTIVE |
| J0 | 106 | 126 |
| J1 | 107 | 127 |
| J2 | 110 | 130 |
| J3 | 111 | 131 |

18-BIT BYTE FORMAT

12-BIT BYTE FORMAT

9-BIT BYTE FORMAT

6-BIT BYTE FORMAT

READ CHARACTER

WRITE CHARACTER

QUARTER-WORD OR HALF-WORD

SIXTH-WORD OR THIRD-WORD

CHARACTER ADDRESSING IN A WORD ORIENTED COMPUTER SYSTEM

BACKGROUND OF THE INVENTION

1. Field Of The Invention

This invention relates generally to apparatus and systems for controlling the operation of a digital data processing system, and it has particular reference to a system for determining an absolute memory address from a programmed relative address, and for selectively reading or writing a predetermined size character as it relates to a predetermined character location within a computer word for a word-oriented computer system. Still more specifically, this invention relates to a system for character addressing in a word-oriented computer system that permits incrementing or decrementing effective character addresses for permitting the handling of strings of characters within the word-oriented computer system addressing circuitry.

2. Description Of The Prior Art

Many existing computer systems are operable as character manipulating systems, and have specially constructed memory accessing circuitry for handling characters and character strings. Many other computers or data processing systems are word-oriented, where a word is normally of a substantially larger capacity than is needed for character manipulation. It is common, for example, for character handling data processing systems to operate on characters that are comprised of six, eight, or 12 binary digit positions per character. It is unusual for character sizes to be mixed within a character handling data processing system. On the other hand, it is common for word-oriented data processing systems to operate on word sizes that are 24-bits, 30-bits, or 36-bits in capacity. There are other types of word-oriented data processing systems that may use other word sizes, but these examples are illustrative of the fact that word-oriented computer systems normally operate with word sizes that are substantially in excess of the character sizes of character manipulating systems.

In internally programmed automatic computers, a storage medium is ordinarily employed as an internal memory for storing operands, and for storing commands. In word-oriented data processing systems, memory accessing systems are known for accessing a full computer memory word, a half-memory word, a third-memory word, or a quarter-memory word. Operands are normally data which is to be operated upon, and the commands collectively are programs to be carried out automatically by the data processing system. It is common practice in many digital computers of the present day to provide a predetermined repertoire of instructions. That is, a predetermined operational capability is defined by each of the individual commands operating to perform a specific designated function. In word-oriented data processing systems, it is common for the repertoire of instructions to be constructed around word or partial word data manipulating capabilities, where the manipulations of operands are normally discretely handled. It is also common in a total instruction word to include in addition to the command or operational portion, an address portion which designates an addressable location in the memory section. Additionally, for those data processing systems which include indexing capabilities, and other well-known control functions, the instruction word contains signals representations indicative of these various control functions. The command portion of the instruction indicates the operation which is to be performed by the computer, and the address portion of the command indicates the address in the storage medium upon which the operation is to be performed. Data processing systems are also known that utilize auxiliary control registers for holding one or more base memory addresses, thereby permitting the combination of the base address or addresses, with a relative address contained in the instruction word. Prior art data processing systems also provide for the combination of base address selection with the base relative address, in conjunction with address indexing for providing a very flexible method of handling word or partial word-oriented addresses.

With the advent of many compiler programming systems and user systems that operate on a character basic, it become necessary for many prior art data processing systems to be extensively programmed to handle operands on a character basis within a word-oriented computer system. These programming approaches required the character-by-character construction of character strings, often referred to as byte strings, in order to make an efficient use of the memory system registers. Barring the assembly by program operation of the characters into a multiple character word for storage in the word-oriented memory register, there would be many unused portions of the memory system. The programmed approach to handling characters within a word-oriented computer system requires the generation of programs for both assembling the multiple character combinations for storage in the word-oriented memory system, as well as for disassembling the multiple character words for ultimate character-by-character operations. When characters of different sizes are to be handled within the same word-oriented computer system by the programmed approach, these manipulation programs or routines of instructions are greatly extended. These programmed routines for accessing particular characters within a word-oriented computer system, either for reading or recording, add substantially to the computational overhead time of the data processing system, and thereby add substantially to the cost of data processing as well as to the last of efficiency and speed of data processing. Then, too, the programmed sequence for handling bytes or characters within a word-oriented computer system must be self-modifying in order to handle strings of characters for a given character manipulating sequence. It is of course apparent that the stored program approach to handling characters in a word-oriented data processing system is inefficient in the use of computational time, and is also inefficient in the use of storage to the extent that the routines of instructions for the character handling need to be stored for repeated use.

It is toward the capability of providing the character addressing, together with character address incrementation or decrementation, the character positioning and selective sign-fill, in an otherwise word-oriented data processing system that the instant invention is directed. The character addressing system in a word-oriented data processing system tends to optimize the computer storage usage by eliminating the need of storing stored program subroutines for the character handling, and tends to maximize computational efficiency by decreasing the overhead time required for programmed character handling.

SUMMARY

In summary, then, this invention provides a character addressing apparatus for use in a word-oriented data processing system having an addressable main memory device, that includes circuitry for addressing the word-oriented memory locations, and character-addressing circuitry coupled to the word-oriented addressing circuitry for selecting a predetermined one of a plurality of character sizes from one of a plurality of character locations in the accessed word. A system for selecting one of a plurality of character sizes is provided by establishing a basic set of numbers of digits for selected character sizes, and providing means for selecting multiples of the basic character sizes. Character addressing for both reading and recording operations are provided. As a selected sized character is read, it is automatically justified to a predetermined location in the word-oriented system, and for this embodiment, the justification is to a right-most position adjacent the binary point. An appropriate selection can cause the sign extension of the character as read. For the recording operation, the character addressing apparatus provides circuitry for positioning a justified character of a predetermined size to the designated location in the word to which the character is to be transferred. Character accessing incrementing circuitry is utilized for accessing predetermined sequences of predetermined size characters in the addressable main memory device. The character addressing is accomplished by providing a character addressing control register that includes signals indicative of the word offset from the basic address, and the character offset within the word accessed. The control register includes a word increment value and a character increment value that are respectively combined with the word offset value and the character offset value for determining the next location of the character to be addressed. The combination of signals of the word offset and the word increment signals is modified by an overflow signal that is received from the combination of the character offset and character increment signals when they pass through a carry or a borrow condition. The character addressing system provides for the selection of various character sizes, and by the selection of the appropriate character offset value together with the appropriate character increment value, the various character sizes can be effectively sequentially referenced either in a positive or negative direction. By use of the word increment value, the character addressing sequence can be modified to effectively address sequences of characters that are not physically adjacent in the main memory, but instead may be offset by many address locations.

The character addressing system operates in a word-oriented data processing system that has utilized a system of memory addressing that is referred to generally as relative addressing. Circuitry is provided for the determination of the basic memory address, as modified by any indexing registers, with the additional modification by the word offset value in determining the absolute memory address. Once a memory address has been absolutely referenced, the reading character circuitry will operate under the control of the character offset field of the control register and the character size control signals and the sign extension signals to provide a selected justified character for use. During the recording operation, a character is provided in a justified position, and the positioning circuitry operates under control of the character offset signals and the character size selection signals to appropriately position the character for recording in the main memory.

In view of the foregoing stated problems in the prior art, and in view of the foregoing summary of the invention, it can be seen that a primary object of this invention is to provide an improved memory addressing system for use in a word-oriented data processing system. A more specific object of this invention is to provide a character addressing system for use in a word-oriented computer system. Yet another object of this invention is to provide character accessing capability within a word-oriented computer wherein the size of the characters can be selected. Still a further object of this invention is to provide a character addressing system for use in a word-oriented computer wherein the accessed character is justified to a predetermined location. Still a further object of this invention is to provide sign extension of a character accessed and justified to a word-oriented computer system. Still another object of this invention is to provide for positioning of characters for storing in a word-oriented computer system. Yet another object of this invention is to provide programmably selectable incrementation of the sequence of addressing characters in a word-oriented system. Yet another object of this invention is to provide a character addressing system that permits the performance of character handling instructions in a word-oriented computer. Yet a further object of this invention is to provide a character addressing system that provides for incrementation or decrementation of character addresses for use in handling character or byte strings during data manipulation. Yet another object of this invention is to eliminate the need for programmed addressing of characters in a word-oriented data processing system. Still another object of this invention is to maximize the computational time that is available for data processing by minimizing the amount of time that is required for the accessing of characters in a word-oriented system. Still a further object of this invention is to provide a character addressing system that permits the selective handling and accessing of different size characters, and automatically provides for the incrementation or decrementation of character addresses for the selected character sizes.

BRIEF DESCRIPTION OF THE DRAWINGS

The foregoing and more detailed purposes and objectives will become apparent from a consideration of the following detailed description of the preferred embodiment, claims, and drawings, in which:

DESCRIPTION OF THE PREFERRED EMBODIMENTS

Figure 1:
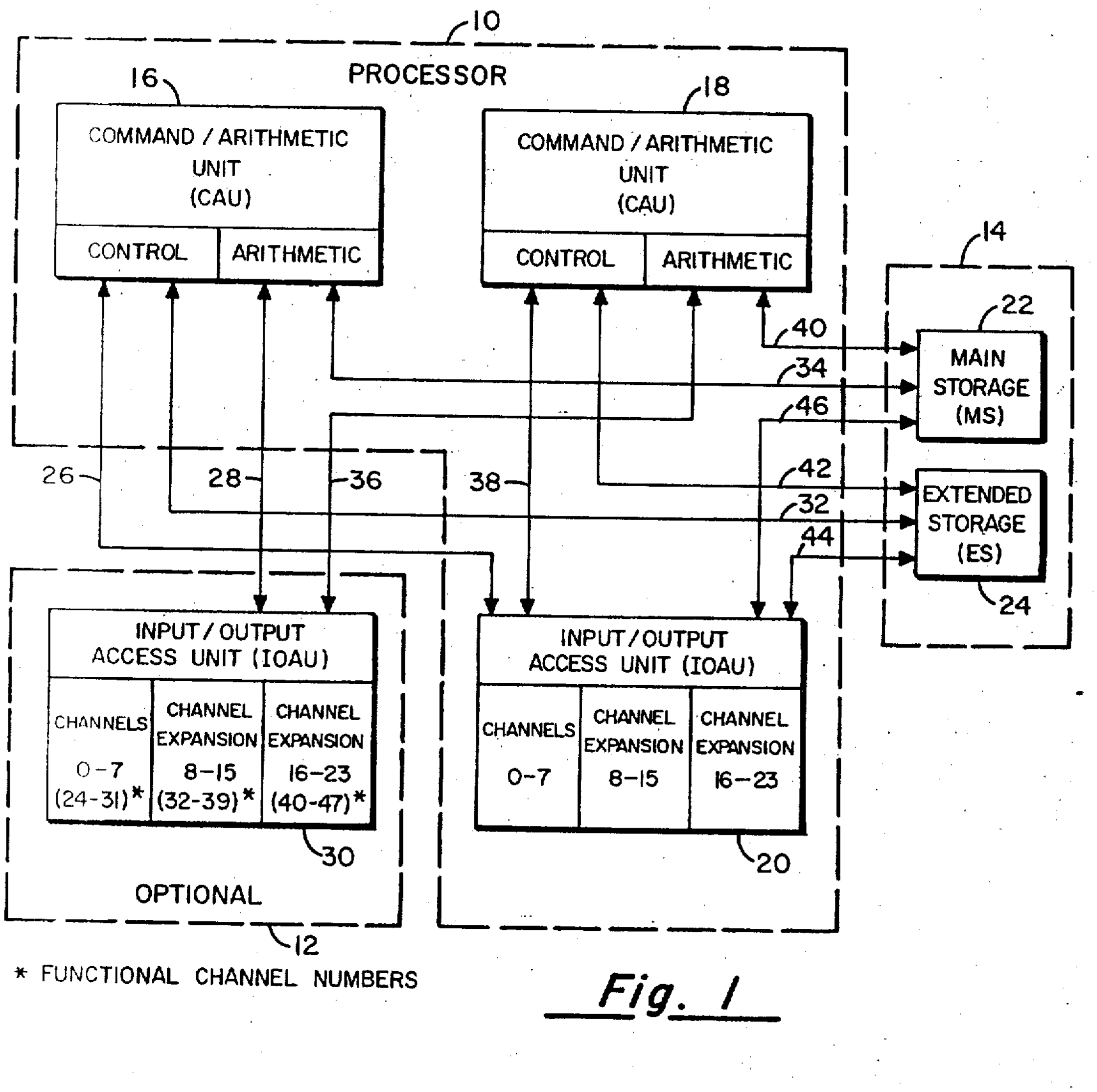
FIG. 1 is a block diagram of the word-oriented data processing system and memory system in which the subject invention is incorporated.

FIG. 1 is a block diagram of a data processing system adapted to include the subject invention. The data processing system includes a Processor enclosed within dashed block 10, an optional Input/Output Access Unit shown within dashed block 12, and a Storage unit shown enclosed within dashed block 14. The Processor 10 is organized in a system basically that of a multi-task processor, and is intended for operation in a multiprocessor system environment. It includes Command Arithmetic Units 16 and 18 otherwise referred to as CAU, and an Input/Output Access Unit 20, referred to as IOAU. Generally speaking, the CAU is an instruction-stacked machine with up to four instructions at various stages of execution at any given time. Basically, there are two paths to Storage 14 from each CAU that may operate simultaneously, if not addressing within the same grouping of memory addresses comprising a storage module. In one configuration, a storage module is 8,192 words.

The Main Storage (MS) 22 consists of modules having 8,192 36-bit words each, with a 368 nanosecond read access time and a 490 nanosecond write-cycle time as seen at the processor interface. Extended Storage (ES) 24 shall be referenced by way of a single access path from each CAU or IOAU. The Extended Storage 24 may consist of up to eight 131,072-word modules of core storage with an access time of approximately 1.5 microseconds. The extended storage access path from the CAU or the IOAU may be multiplexed, that is, a second reference can be initiated while waiting for the completion of a prior reference.

CAU 16 has a pair of access paths 26 and 28 in communication with IOAU 20 and IOAU 30, respectively. CAU 16 also has a pair of access paths 32 and 34 in communication with Extended Storage 24 and Main Storage 22, respectively. CAU 18 has a similar arrangement, and has a pair of access paths 36 and 38 in communication with IOAU 30 and IOAU 20, respectively. CAU 18 is in communication with Main Storage 22 by access path 40, and with Extended Storage 24 by access path 42. Extended Storage 24 and Main Storage 22 are in communication with IOAU 20 through access paths 44 and 46, respectively. The system generally provides word-oriented memory references and data handling.

Processor 10 through CAU units 16 or 18 shall have direct-address generation capabilities of up to 16,000,000 words of storage, utilizing a 24-bit address configuration. The system electronics provide direct address capability of 262,144 words of storage in Main Storage 22, and 1,000,000 words of Extended Storage 24.

Each CAU 16 or 18 includes an arithmetic section and a control section. The arithmetic section does all of the actual computations such as addition, subtraction, multiplication, division, and byte format and floating-point format conversions. The arithmetic sections also perform certain logical functions such as shifting and comparing. The arithmetic sections also include various registers for providing intermediate storage.

The control sections of the CAU include circuitry for forming the operand addressing, indexing, memory limits decision checks, instruction buffering and instruction function code decoding and control, as well as providing over-all regulation of each instruction operation and timing. These functions, as they relate to the subject invention, will be discussed in more detail below.

The IOAU units 20 and 30 provide the capability of communicating bi-directionally with peripheral units.

The memory system 14, including Main Storage 22 and Extended Storage 24, provide data storage facilities constantly required by the data processing system as it performs its computation, as well as providing storage of the program being operated by the processing system. For the embodiment under consideration, a storage register is basically considered to be a 36-bit storage entity. Various full-word or partial-word addressing techniques are utilized.

Figure 2:
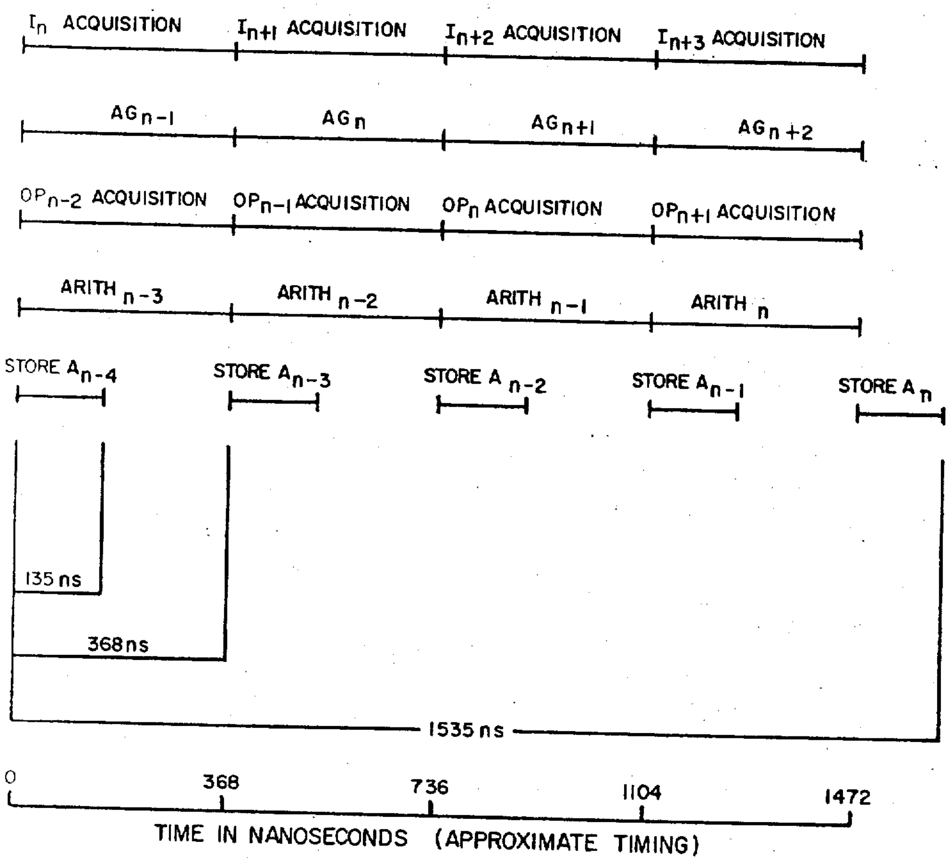
FIG. 2 illustrates the instruction acquisition, translation, operation, and storage overlap.

FIG. 2 illustrates the approximate timing relationship involved in the instruction overlapped mode of operation. The instruction executions are generally involved with a series of five basic timed operations of sequences. These sequences are:

1. Instruction acquisition sequence, a sequence which obtains an instruction from storage;
2. Address generation sequence, a sequence which generates an absolute address to be used for referencing storage;
3. Operand acquisition sequence, a sequence which obtains an operand from storage;
4. Arithmetic sequence, a sequence which uses arithmetic hardware to complete its execution of an instruction; and 5. Results storage sequence, a sequence which stores the results of an arithmetic operation in a hardware register.

Due to the four-deep instruction stack and dual-access path arrangements, these sequences may be initiated in such a manner that although approximately 1,535 nanoseconds may lapse between initial instruction acquisition and final instruction execution for a typical single-precision add instruction, an effective execution rate of one instruction per 350 nanoseconds is obtainable.

Figure 3:
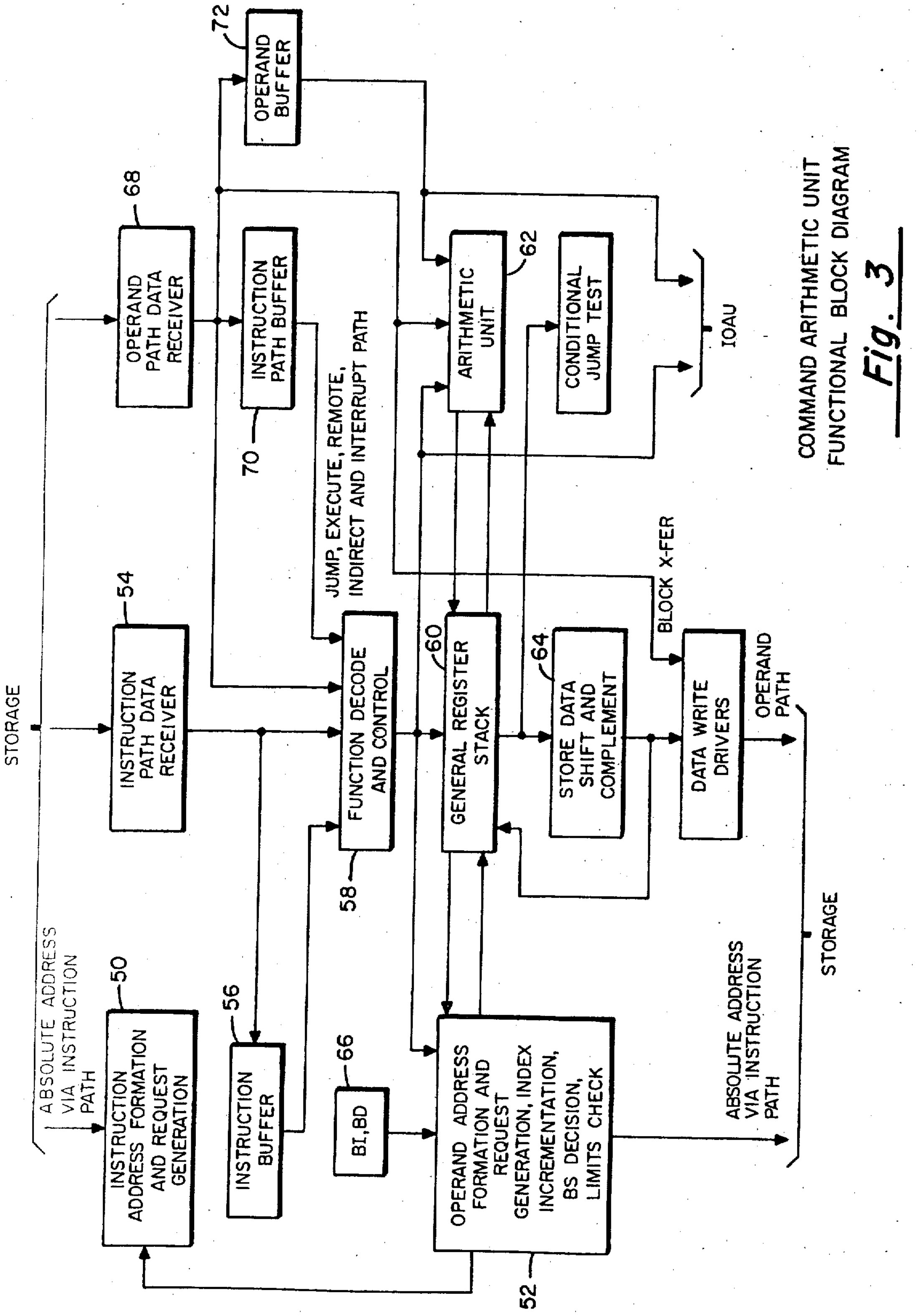
FIG. 3 is a functional block diagram of the command arithmetic unit in which the subject invention is incorporated.

FIG. 3 is a functional block diagram of a Command Arithmetic Unit, wherein address formulation, General Register Stack access, conditional jump operations, arithmetic computations, and character handling instructions are performed functionally under central control.

Figure 4:
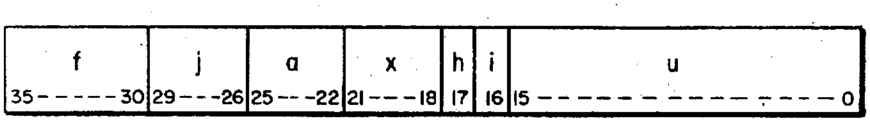
FIG. 4 illustrates the format of the instruction word.

FIG. 4 illustrates the format of an Instruction Word, and utilizes 36-bits. The function code designator (f-field) specifies the particular type of operation or function to be performed by the data processing system. The operand qualifier or minor function code designator (j-field) specifies whether a whole word or a certain portion of a word will be transferred to or from the memory area specified by the function. In certain instructions, the j-field combines with the f-field to form an extended function code or General Register Stack address. The A-Register designator (a-field) is interpreted in one of several ways depending upon the instruction function code. For various configurations, the index registers will be used in the indexing operation. The index register incrementation designator (h-field) if set, controls the modification of the index value ($X_m$) by the increment field ($X_i$) after indexing. If $h = 1$ the ($X_m$) is modified by ($X_i$) of the index registers specified by the x-field except that the I-bit of a J-Register may specify incrementing the J-Register instead of the X-Register. The indirect addressing designator (i-field) controls the use of indirect addressing during instruction execution. If $i = 0$, the instruction functions normally. If $i = 1$ and the Processor State Register (PSR) bit )not shown) bits D7 and D11 are equal to zero, the 22 least significant bit positions of the instruction are replaced in the instruction register with the contents of the 22 least significant bit positions of the contents of the U address. Indirect addressing continues as long as $i = 1$, with full indexing capability at each level. If bit D7 is set for base register suppression, and $i = 1$, the addition of BI or BD is inhibited so that U is the absolute address. If bit D11 is set to select the operand base selector, and $i = 1$, a utility base is utilized. These indirect addressing operations will be discussed in no more detail below. The displacement field (u-field) normally specifies the operand address. For certain instructions, the u-field designates a constant, and for shift instructions designates the shift count. In all instructions, the value specified in the u-field may be modified by the contents of an index register.

Table I illustrates the instruction word field designations.

| | |
|---|---|
| *f*-Field | *a*-Field |
| 00–77 | GRS address for the store of Arithmetic results or arithmetic operand (Aa) |
| *j*-Field | GRS address for the X Register (Xa) |
| Partial word qualifier if $f < 70_8$ and $f$ 07, 33, 37 | GRS address for the R Register (Ra) |
| If $j$ = 4, 5, 6, or 7 & PSR D4 set (character addressing mode) will address J Register in GRS. | Designate an I/O Channel number (Ca) |
| Minor function designator if $f > 70_8$ | Designate a jump key (Ka) |
| Minor function designator if $f < 70_8$ and $f$ = 07, 33, 37. | Designate a stop key (Ka) |
| $j$ = 16 or 17 (Data) | Minor function code designator (such as a 7314) |
| $x = 0 - h, i, u$ | *h*-Field |
| $x = 0 - u, xm$ | Increment the X Register |
| *x*- Field | (X 0 and H = 1) |
| Index Register | *i*-Field |
| *u*-Field | |
| $u + xm$ $200_8$ – storage address | Indirect addressing if PSR D7 and D11 = 0 |
| $u + xm < 200_8$ – GRS address except $60_8 - 77_8$ | Base Register suppression if PSR D7 set and *i* bit set |
| Shift count on shift instruction | Use PSR U if PSR D11 set and if *i* bit set |

INSTRUCTION WORD DESIGNATIONS

TABLE I a-field may specify, one, two, and three A-Registers, an R-Register, an X-Register, or in specific instances the j- and the a- fields are combined to specify a General Register Stack address. The a-field also is used to specify the I/O channel, jump keys, stop keys, or a variation in the operation performed by some instructions. The index register designator (x-field) when in a zero state, shall specify that an indexing operation is to be performed, and shall specify which one of 15 possible Returning to a consideration of FIG. 3, the Instruction Address Formation and Request Generation circuitry 50 accepts a 24-bit absolute address from the Operand Addressing Section 52 after a Jump or initial start. The jump or initial instructions are routed from the operand acquisition sequence to the instruction sequencing section. The address accepted by the Instruction Address Formation and Request Generation circuitry 50 is increased by 1 and upon receipt of the proper acknowledge, the next request is sent to storage. Consecutive instruction refencing continues until an executed jump instruction or an interrupt disrupts the sequence, in which cases a new absolute address is received from the Operand Addressing Section. When an instruction is referenced and read from storage, it is provided to the Instruction Path Data Receiver 54 and is routed either to the Instruction Buffer 56 or the Function Decode and Control 58. When an instruction is directed to Function Decode and Control 58, the f-, j-, and a- designators are interpreted by control circuitry and appropriate control paths are initiated.

The addressing portion of the instruction word is directed to Operand Address Formation and Request Generation, Index Incrementation and BS Decision circuitry 52.

Figure 5:
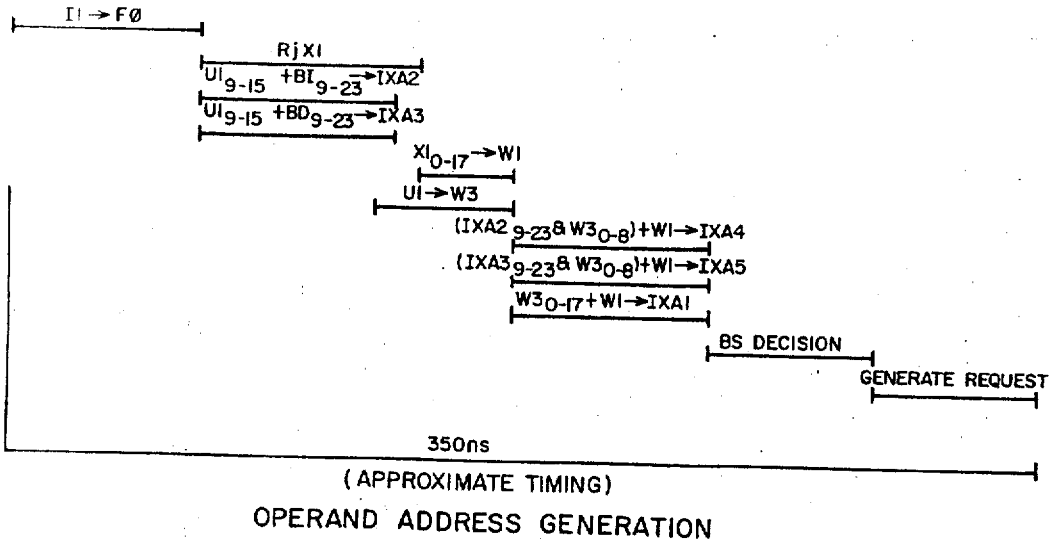
FIG. 5 illustrates the approximate timing of the operand address generation sequence.

FIG. 5 illustrates the approximate timing of an operand address generation sequence. During the address generation sequence, the contents of an index register is read and the lower half of the specified index register is added to the u-field of the instruction to form a relative address. A base register is added to the relative address to form the absolute address of a specified operand. If the relative address is determined to be less than $200_8$, the operand reference will fall within the General Register Stack. During the address generation sequence, if the *h* designator is set, the upper half of the specified index register is added to the lower half and the result restored in the General Register Stack locations specified by the x-field of the instruction. Depending upon the type of instruction, the temporary arithmetic holding register specified by the a-field of the instruction may be read out. If the data read from the General Register Stack 60 is to be used by the Arithmetic Section 62, it is passed to a holding register. If this data is to be used by a store instruction it is gated to the store data portion of the Store Data Shift and Complement circuitry 64, or to the input data register for the General Register Stack 60 for those relative addresses less than $200_8$. If the instruction is a conditional jump instruction dependent on the contents of an arithmetic register, the A-Register specified shall be sampled during the address generation sequence, so that if a jump is to be taken, the operand acquisition sequence may read the first instruction along the jump path. The operand addressing system can be of a type illustrated and described fully in U.S. Pat. No. 3,389,380 entitled "Signal Responsive Apparatus" invented by James P. Ashbaugh, James C. Borgstrom, and Thomas C. Tollefson, and assigned to the assignee of the present invention.

Figure 6:
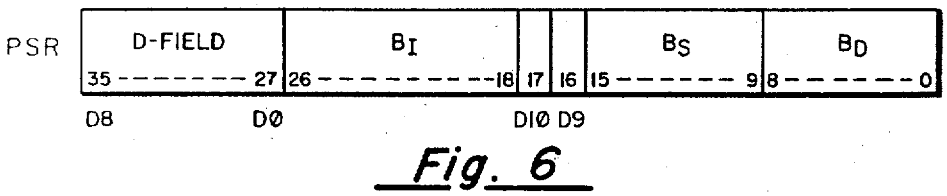
FIG. 6 illustrates the format of the Processor State Register.

As used in the relative addressing calculation, the quantities BI, and BD shown as constants from circuitry 66, are the constants stored in the Processor State Register PSR illustrated in FIG. 6.

Figure 7:
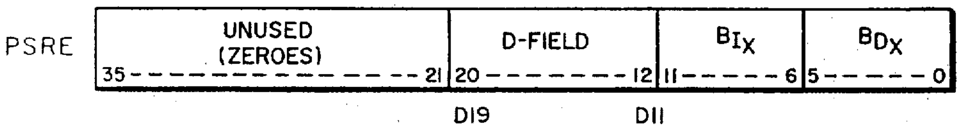
FIG. 7 illustrates the format of the Processor State Register extension.

FIG. 7 illustrates the Processor State Register Extension (PSRE). Table II, set forth below, illustrates the processor state register word format designations.

PROCESSOR STATE REGISTER WORD FORMAT DESIGNATIONS

TABLE II

PSR — first word of main PSR
PSRE — second word (extension portion) of main PSR
D-Field — location of control bits Dϕ through D8
$B_I$ — Instruction Bank Base Value
$B_S$ — Base Selection Value
$B_D$ — Data Bank Base Value
Dϕ — carry designator
D1 — overflow designator
D2 — guard mode and storage protection > interaction
D3 — write only storage protection
D4 — character addressing mode
D5 — double-precision underflow
D6 — control register (GRS) selection (EXEC ABR)
D7 — base register suppression (EXEC Mode) Fϕi Bit must also be "1" for suppression)
D8 — floating point zero
D9 — index register mode selector (24 bit if set and D7 and the i-bit of instruction are also set)
D10 — quarter-word mode
D11 — operand base selector. If "ϕ" — use BI, BD, BS from PSR and PSRE. If "1" and *i* is "1" — force use of BI, BD, BS from PSRU and PSRUE the jump operand is excluded.
D12 — PSR SLR Selector (PSRU PSRUE and SLRU if set; PSR, PSRE and SLR if clear) Allows most used storage in fast storage and least used in slow storage.
D13 — PSR I-bank write selector (write illegal if set)
D14 — PSR D-bank write selector (write illegal if set)
D15 — PSRU I-bank write selector (write illegal if set)
D16 — PSRU D-bank write selector (write illegal if set)
D17 — If set — return the residue (single precision F.P.) If clear — throw away the residue
D18 — PSR and Storage Limits Register Auto-Switch on non jump inst (D12 = ϕ and D18 = 1, and limit error condition) use PSRU on next inst. only. On jump inst. — (D12 = ϕ and D18 = 1 and Limit error condition)
Set D12 which gives permanent switch.
D19 — EXEC MDP allow
$B_{I_x}$ — 6-bit extension value for $B_I$
$B_{D_x}$ — 6-bit extension value for $B_D$ The unused field of the PSRE (bits 35–21) must be zeroes. Instruction execution time is extended if either D11 or D18 is set. Control bits D7 and D11 must not both be set at the same time. Control bits D11 and D12 must not both be set at the same time.

The operand acquisition sequence normally involves an operand requested from storage. When the acknowledge has been received, and the operand is received at the input of the Operand Path Data Receiver 68, the operand is available either to be directed to the Function Decode and Control circuitry 58, to be directed to the Instruction Path Buffer 70, or to be directed to the Operand Buffer 72, depending upon the nature of the operand received. In the case of a double length operand, the sequence would be repeated. In the case of an operand reference to the General Register Stack 60, the contents of the designated storage location in the General Register Stack is read.

The arithmetic sequence accepts operands from the General Register Stack 60, and in some cases from storage, and performs the arithmetic operation indicated by the decoding of the instruction function code. The specific address designations of the General Register Stack is as illustrated in Table III below.

GENERAL REGISTER STACK (GRS) ADDRESS ASSIGNMENTS

TABLE III

| OCTAL | | DECIMAL | | |
|---|---|---|---|---|
| 0 | NONINDEXING REGISTER (XO) PSR TEMPORARY STORAGE | 0 | UNASSIGNED | |
| 1 | X1 XI-XII Xm | 1 | 15 INDEX REGISTERS (X) | |
| 13 | | 11 | | |
| 14 | A0 - A3 | 12 | 4 OVERLAPPED (X or A) | |
| 17 | | 15 | | |
| 20 | A4 - A15 | 16 | 16 ACCUMULATORS (A) | |
| 33 | | 27 | | |
| 34 | | 28 | 4 UNASSIGNED | |
| 37 | | 31 | | |
| 40 | PROCESSOR STATE REGISTER (MAIN) | 32 | | ↑ |
| 41 | TEMPORARY STORAGE | 33 | TEMPORARY STORAGE FOR 4 PROCESSOR STATE REGISTERS | |
| 42 | PROCESSOR STATE REGISTER | 31 | | |
| 43 | (UTILITY) TEMPORARY STORAGE | 35 | 2 MEM. DESCRIPTOR POINTER REGISTERS | |
| 44 | EXEC MEM. DESCRIPTOR POINTER REGISTER | 36 | | |
| 45 | USER MEM. DESCRIPTION POINTER REGISTER | 37 | | |
| 46 | CURRENT MEM. DESCRIPTOR INDEXES (PACKED) FOR MAIN PSR | 38 | 2 MEM. DESCRIPTOR INDEXES | |
| 47 | CURRENT MEM. DESCRIPTOR INDEXES (PACKED) FOR UTILITY PSR | 39 | | |
| 50 | UNASSIGNED | 40 | UNASSIGNED | EXE |
| 51 | STORAGE PARITY CHECK STATUS WORD | 41 | | |
| 52 | INTERFACE PARITY CHECK STATUS WORD | 42 | | |
| 53 | GUARD MODE INTERRUPT STATUS WORD | 43 | 5 INTERRUPT STATUS WORDS | |
| 54 | UNDEFINED SEQUENCE INTERRUPT STATUS WORD | 44 | | |
| 55 | SYSTEM INTERRUPT STATUS WORD | 45 | | |
| 56 | MAIN STORAGE REFERENCE COUNTER | 46 | 2 STORAGE REFERENCE COUNTERS | |
| 57 | EXTENDED STORAGE REFERENCE COUNTER | 47 | | |
| 60 | NOT USABLE | 48 | 16 NOT USABLE | |
| 77 | | 63 | | ↓ |
| 100 | REAL TIME CLOCK (R0) | 64 | 16 SPECIAL REGISTERS (R) | |
| 101 | REPEAT COUNT REGISTER (R1) | 65 | | |
| 102 | MASK REGISTER (R2) | 66 | | |
| 103 | R3-R5 STAGING REGISTERS OR SR1-SR3 | 67 | | |
| 105 | | 69 | | |
| 106 | R6-R9 J - REGISTERS OR J0-J3 | 70 | | |
| 111 | | 73 | | |
| 112 | UNASSIGNED (R10-R15) | 74 | | |
| 117 | | 77 | | ↑ |
| 120 | UNASSIGNED (R0) | 80 | 16 SPECIAL REGISTERS (R) | |
| 121 | REPEAT COUNT REGISTER (R1) | 81 | | |
| 122 | MASK REGISTER (R2) | 82 | | |
| 123 | R3-R5 STAGING REGISTERS OR SR1-SR3 | 83 | | |
| 125 | | 85 | | |
| 126 | R6-R9 J - REGISTERS OR J0-J3 | 86 | | |
| 131 | | 89 | | |
| 132 | UNASSIGNED (R10-R15) | 90 | | |
| 137 | | 95 | | |
| 140 | NONINDEXING REGISTER ($X_0$) | 96 | UNASSIGNED | EXEC |

GENERAL REGISTER STACK (GRS) ADDRESS ASSIGNMENTS

TABLE III

| OCTAL | | | DECIMAL | |
|---|---|---|---|---|
| 141 | | | 97 | |
| | Xi Xm | | | 15 INDEX REGISTERS (X) |
| 153 | | X1-X11 | 107 | |
| 154 | | | 108 | |
| | | | | OVERLAPPED (X or A) |
| 157 | A0 - A3 | | 111 | |
| 160 | | | 112 | |
| | | | | 16 ACCUMULATORS (A) |
| 173 | A4 - A15 | | 123 | |
| 174 | | | 124 | |
| | UNASSIGNED | | | |
| 177 | | | 127 | 4 UNASSIGNED |
| | ← 36 BIT & PARITY → | | | |

When the Arithmetic Unit 62 has completed the specified operations, control signals are returned, and the results of the arithmetic operation are directed to the appropriate temporary arithmetic registers in the General Register Stack 60.

The memory address limits check illustrated in circuitry 52, provides for testing the absolute memory addresses as generated, for determining whether or not the addresses are within permissible address ranges. A system for performing the limits check can be similar to that described in U.S. Pat. No. 3,263,218, entitled "Selective Lockout of Computer Memory" invented by Duane H. Anderson, and assigned to the assignee of this invention.

The data processing system illustrated in Fig. 1 includes character addressing capabilities. These capabilities include the ability to manipulate character addresses in essentially the same manner as full word addresses. There are basically two modes of utilization of character addressing capability. The first of these modes of operation is specified in the following manner:

1. Designator bit D4 in PSR specifies the character indexing mode;
2. The instruction f-field values are within a specified grouping indicative of the capability of character addressing; and
3. The instruction j-field values of $4_8$ through $7_8$ are defined by addressing one of four J-Registers, where the J-Registers are identified as registers R6 through R9.

Figure 8:
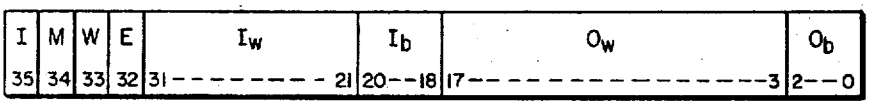
FIG. 8 illustrates the format of the J-Registers utilized in character addressing mode, and sets forth the basic addresses for the identified J-Registers.

The format of the J-Register is shown in FIG. 8. The information contained in the J-Register specifies a word offset $O_W$, a character offset within a word $O_b$, a sign extension, and incrementation and decrementation of the word and character off-set. This first mode extends full indexing capabilities to six-bit, nine-bit, 12-bit, and 18-bit characters. Table IV, set forth below, provides the J-Register word format designations.

J-REGISTER WORD FORMAT DESIGNATIONS

TABLE IV

Fields:

| | |
|---|---|
| I = | J-Register modifier bit; used with the instruction word h-field to control J-Register and X-Register modification. |
| M = | Mode 6/9 bits:<br>O = 9-bit mode (ASCII) The eight least significant bits in each quarter-word are used; the most significant bit (left most bit in each quarter word) must be zero.<br>1 = 6-bit mode (Field Data) |
| W = | Width 6-12 or 9-18 bits:<br>O = 6/9 bits<br>1 = 12/18 bits |
| E = | 1 Sign is extended if receiving location is wider than character. Used only for character addressing; must be zero for all Byte Instructions. |
| $I_w$ = | Increment in words. |
| $I_b$ = | Increment in bytes. |
| $O_w$ = | Offset in words. |
| $O_b$ = | Offset in bytes. |

The second mode of character addressing operation applies to the character manipulation sub-set of the instruction repertoire. The second mode of operation generates addresses in the same manner as described above, however, the J-Registers are implicitly addressed by the function code in the instruction word instead of the j-field of the instruction word. This mode of operation is specified by the instruction f- and j-field values for the character instruction sub-set of instructions.

The generation of addresses in the character mode proceeds by reading the X and J Registers specified in the instruction from the General Register Stack. The 18-bit relative address is constructed by adding the 16-bit u-field of the instruction word to the 18-bit $X_m$- field of the index word and the 15-bit $O_w$-field of the J-Register that is selected by the instruction. The three-bit $O_b$-field of the selected J-Register is used to select the desired character within a word and is not part of the address generation. The absolute storage address is generated as described above.

The character address incrementation is provided in two parts. The first part involves the word off-set, $I_w$ and $O_w$-fields, of the J-Register format; and the second part the off-set in characters $I_b$ and $O_b$-fields. The most significant bit of the $I_w$-field, that is bit-31, specifies the sign of the increments for both $I_W$ and $I_b$. The legal values of $I_b$ and $O_b$ are restricted to specifying characters within a word. When the value of $I_b + O_b$ exceeds the number of characters in a word the value of $I_w + O_w$ is incremented or decremented depending upon the sign of $I_W$. The h-bit in the instruction and the I-bit of the J-Register control the incrementation.

The set of processor instructions involving byte-manipulation includes extended sequence instructions. Certain ones of the byte-manipulation instructions have the capability of being interrupted. All staging and control information necessary to handle byte strings is held in registers that can be savef for future reference upon interrupt.

Figure 9:
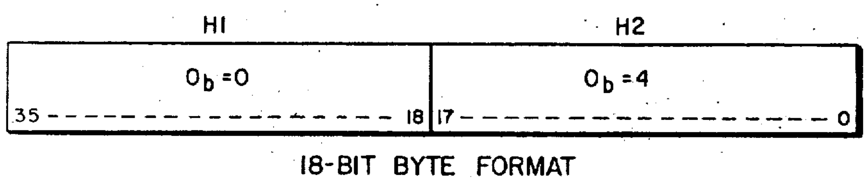
FIG. 9 illustrates the format of the 18-bit byte format, or the half-word format.

FIG. 9 illustrates the format of the word comprised of two 18-bit characters, designated H1 and H2. The characters are designated from left to right, and the character off-set $O_b$ is equal to zero for H1 and is equal to 4 for H2. The various character off-set designations will be described in more detail below, and generally comprise numbers that are required in the circuitry to create an effective +1 or −1 relationship of the characters.

Figure 10:
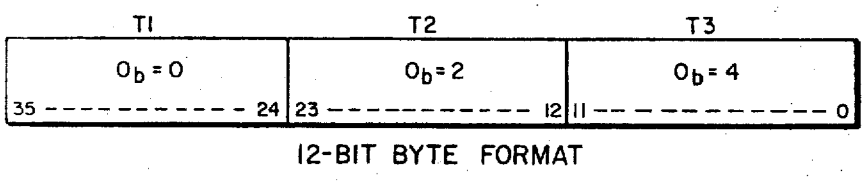
FIG. 10 illustrates the 12-byte data format, or the third-word character format.

FIG. 10 illustrates the format of the third-word character arrangement, wherein each character is comprised of plural bits. The characters are designated T1 with a character off-set of O, T2 with a character off-set equal 2, and T3 with a character off-set of 4.

Figure 11:
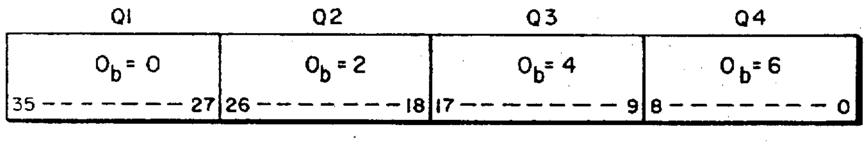
FIG. 11 illustrates the format of the nine-bit byte word, or the quarter-word format.

FIG. 11 illustrates the format of the quarter-word characters, each character comprised of nine-bits. In this format, the character for a single word are designated Q1 with a character off-set of 0, character Q2 with a character off-set of 2, character Q3 with a character off-set of 4, and character Q4 with a character off-set of 6.

Figure 12:
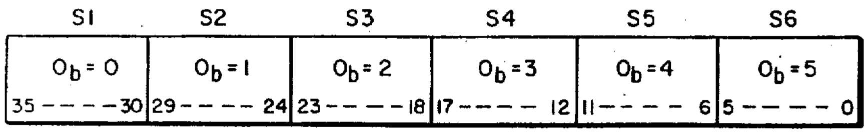
FIG. 12 illustrates the six-bit byte format, or the sixth-character format.
Figure 13A:
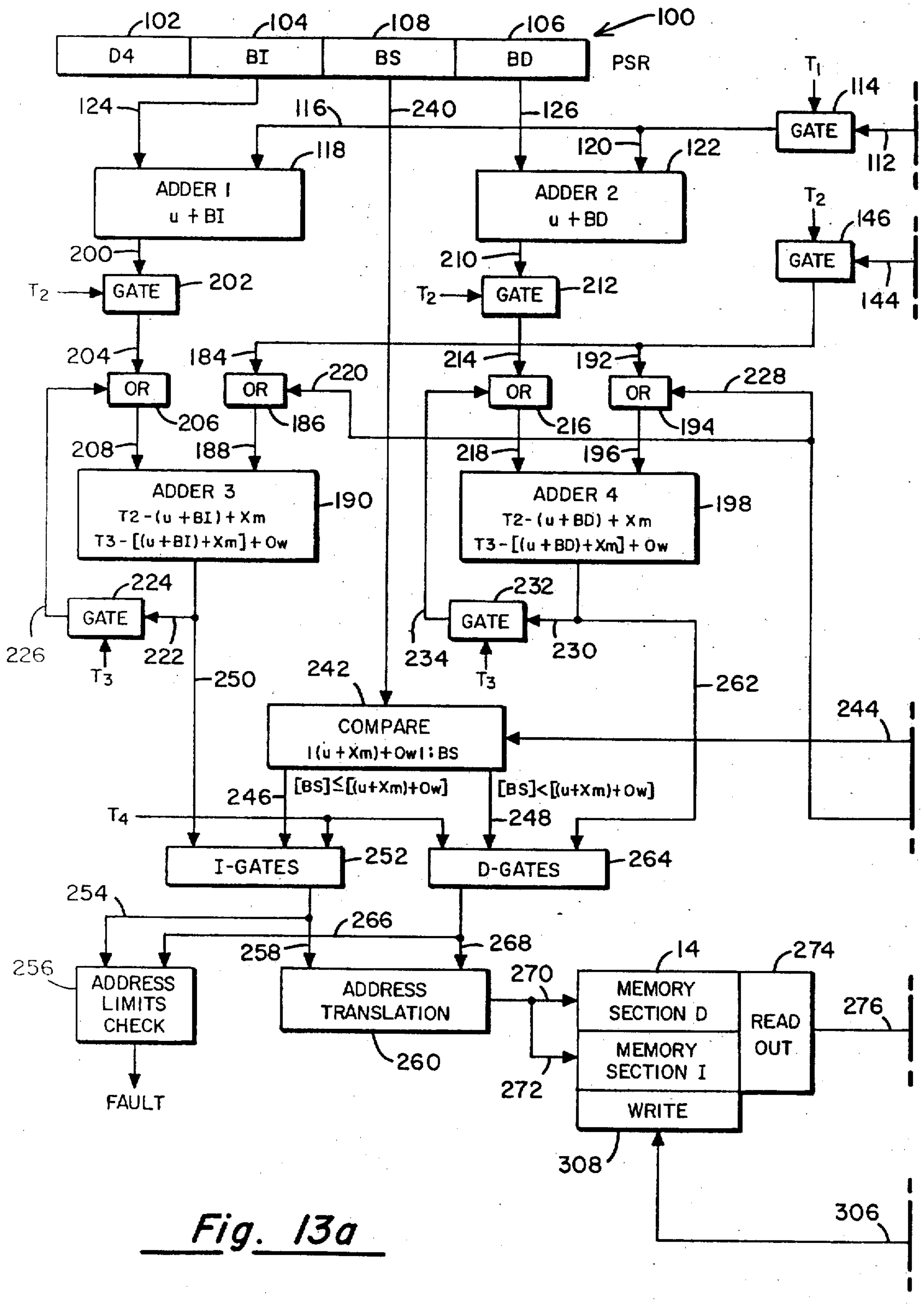
Figure 13B:
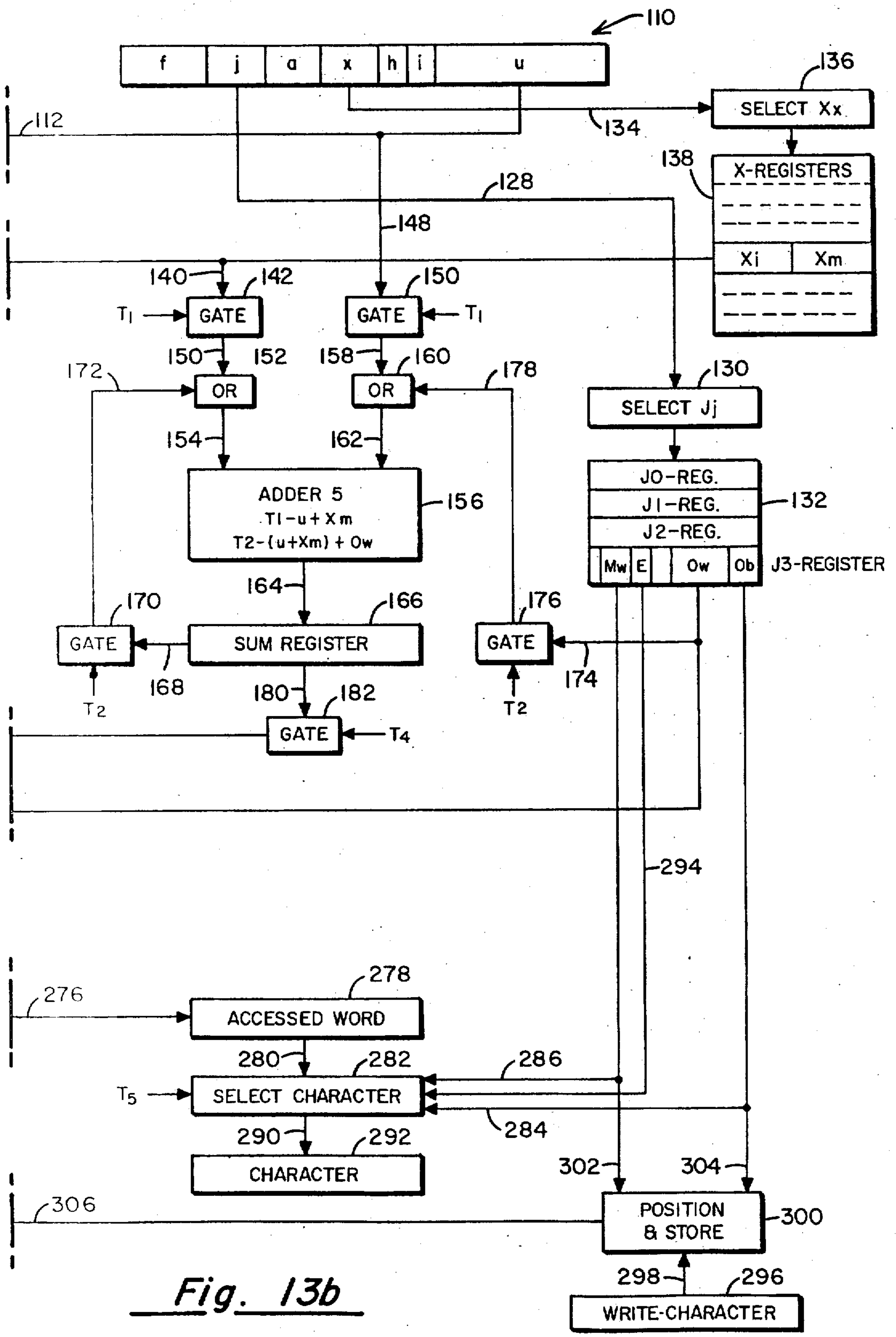
Figure 14A:
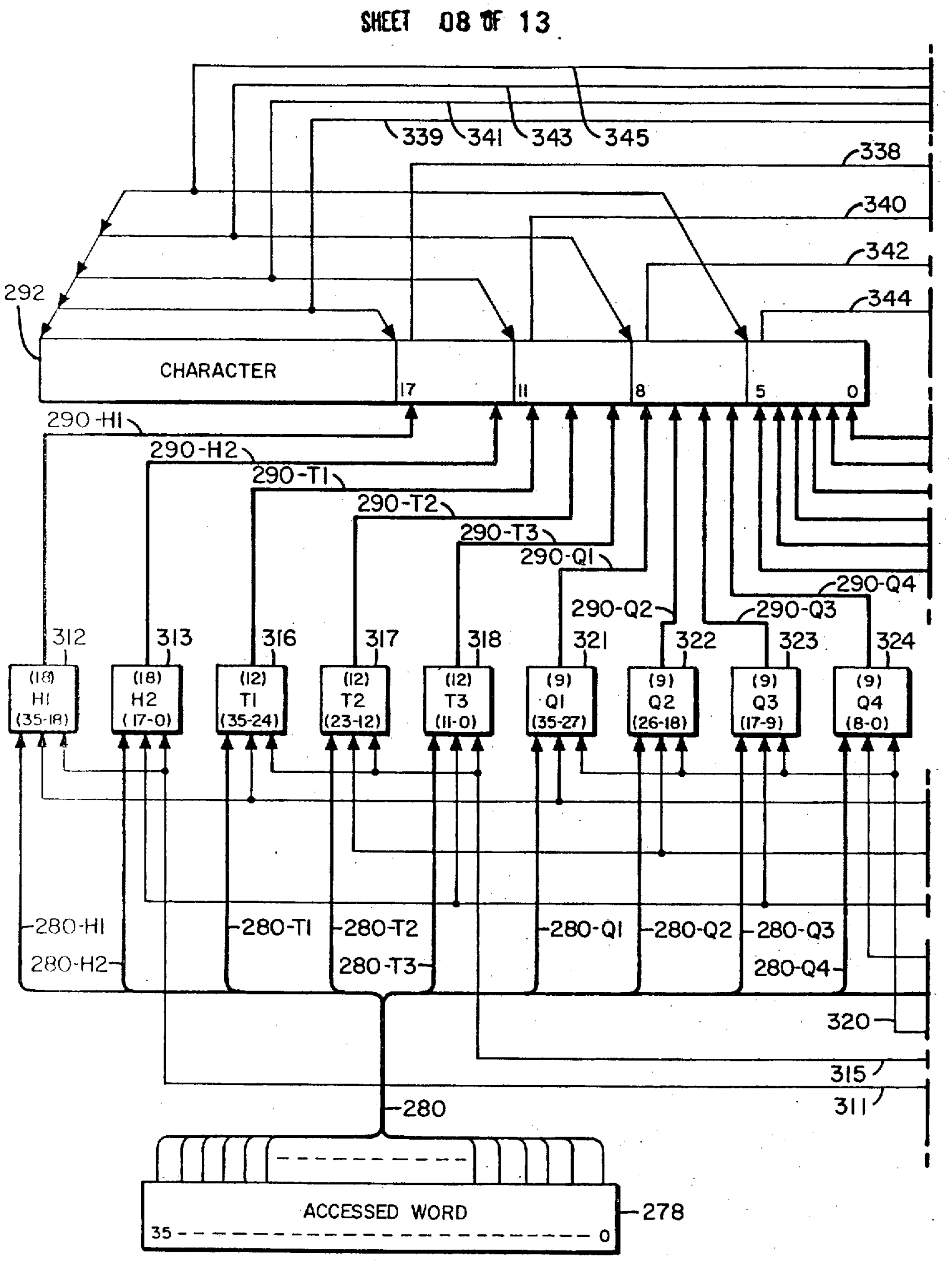
Figure 14B:
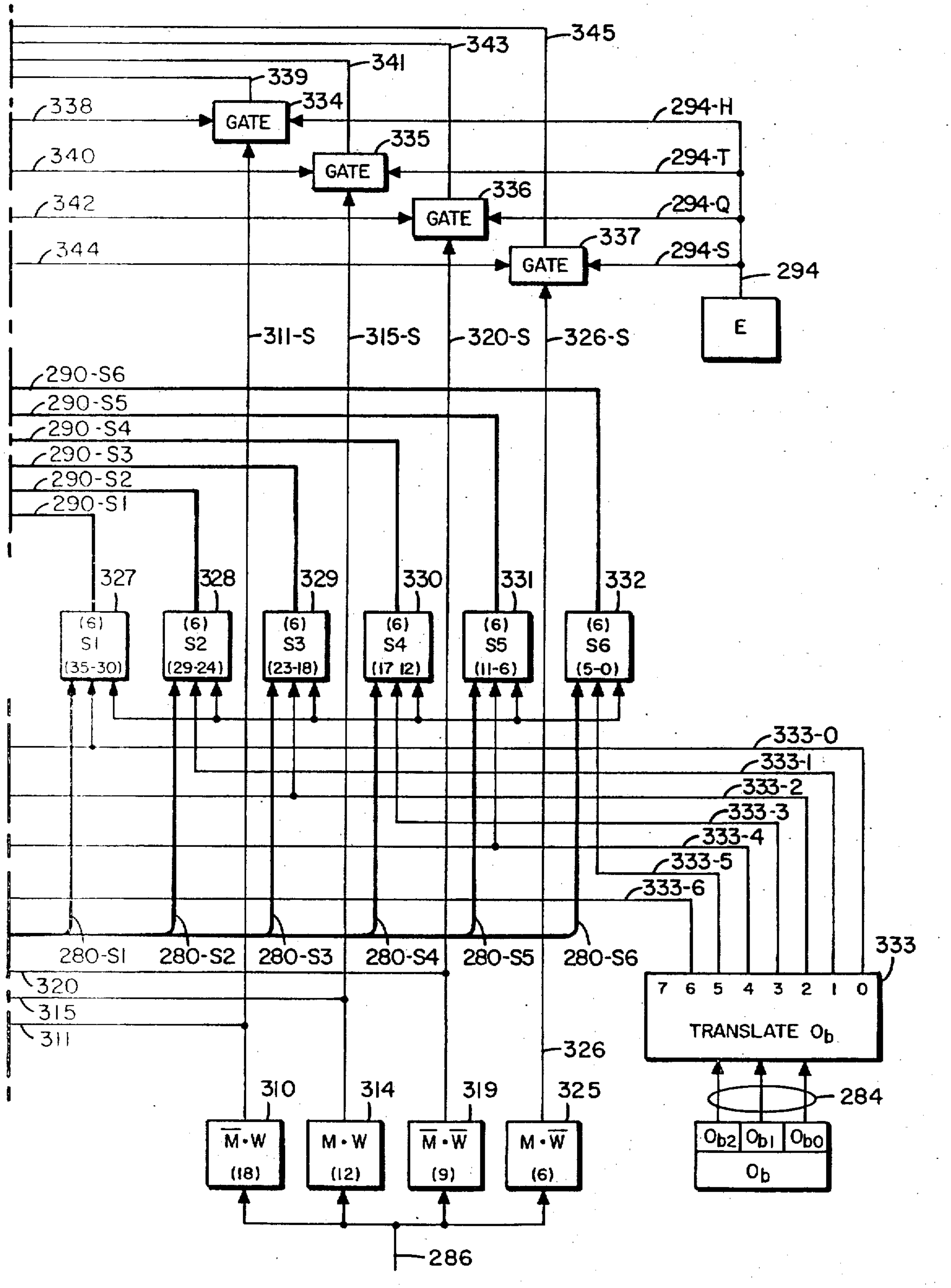
Figure 15A:
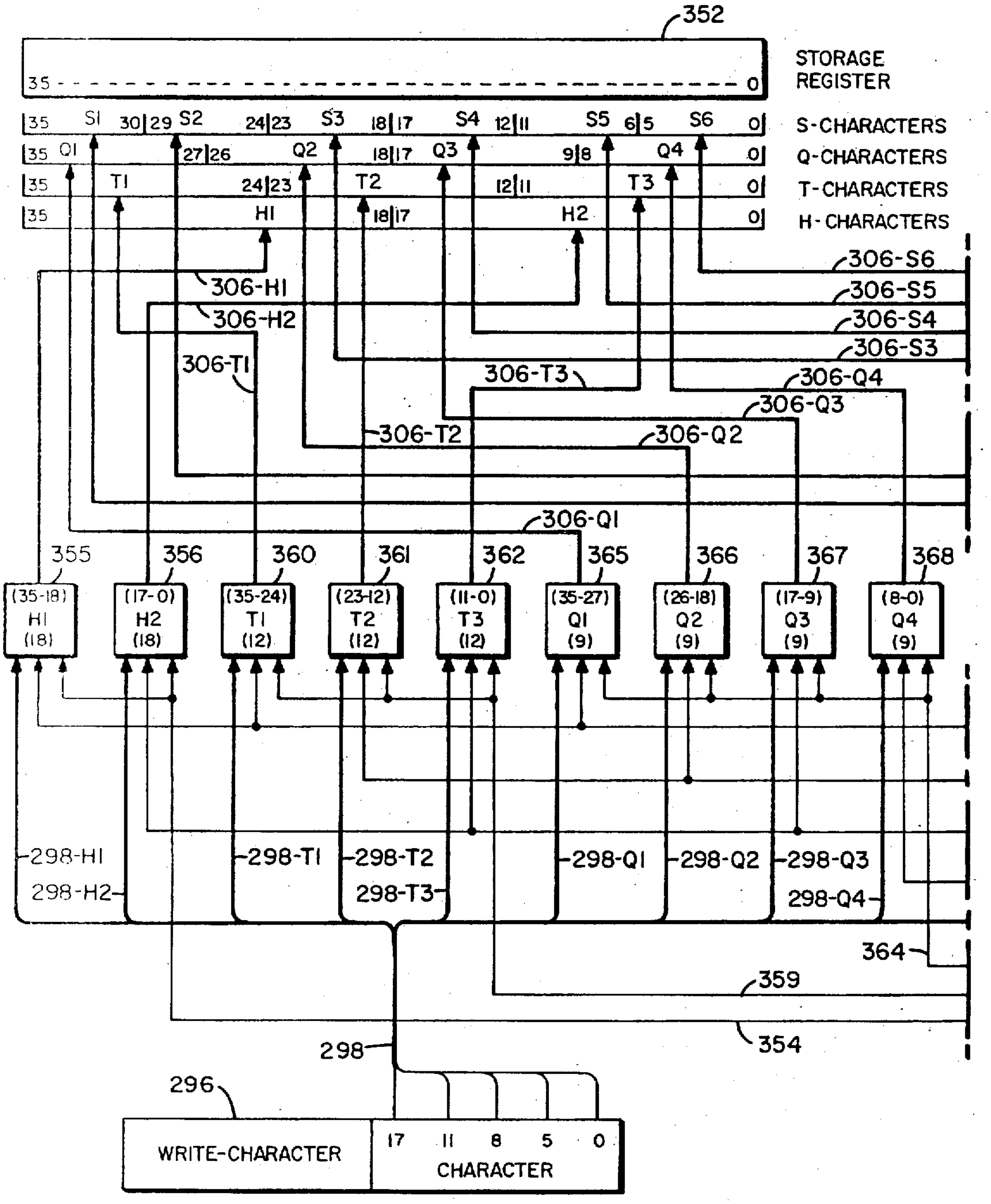
Figure 15B:
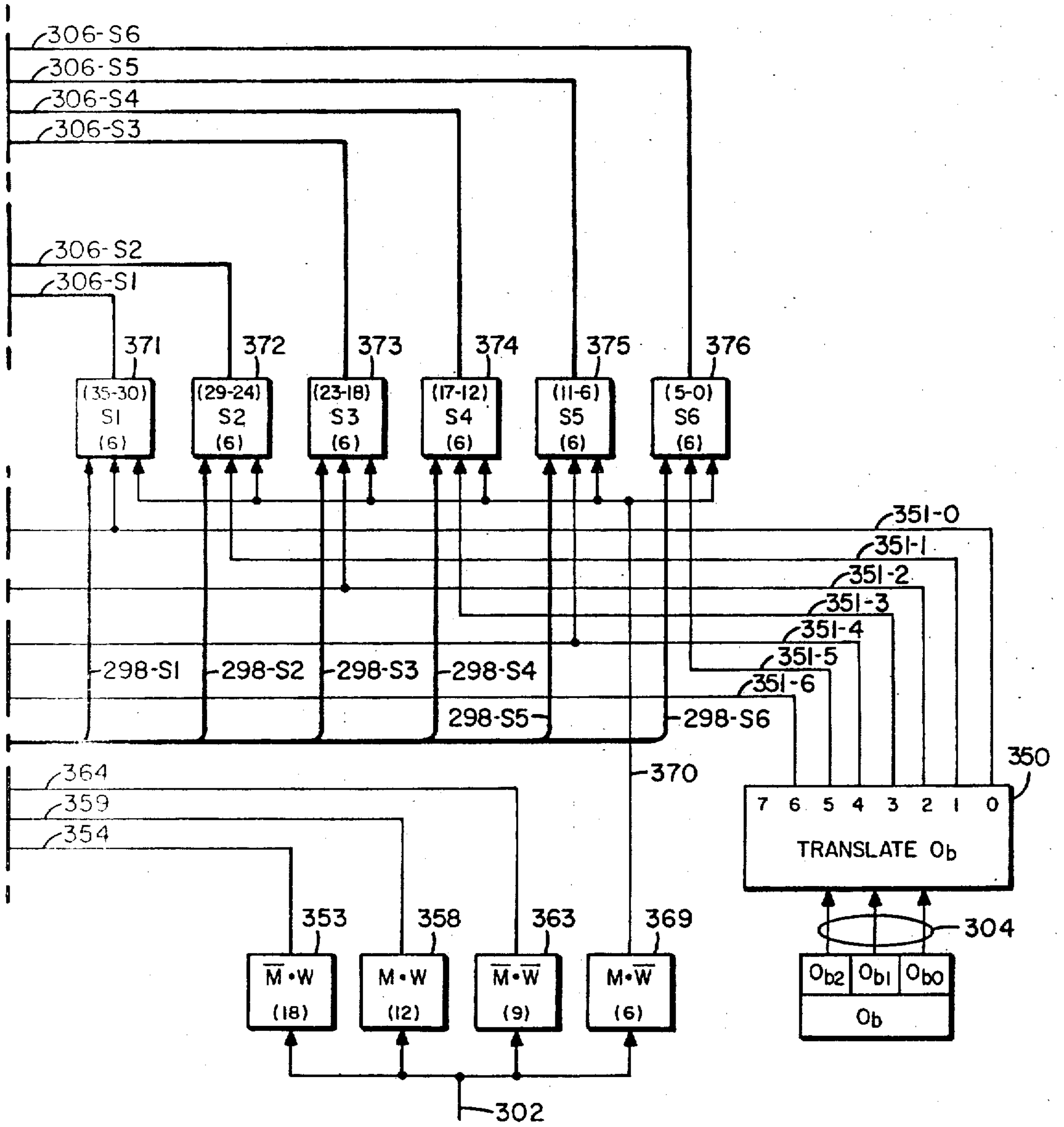

FIG. 12 illustrates the sixth-word character format, wherein each character is comprised of six-bits. The characters are designated in order as character S1 with a character off-set of O, character S2 with a character off-set of 1, character S3 with a character off-set of 2, character S4 with a character off-set of 3, character S5 with a character off-set of 4, and character S6 with a character off-set of 5.

The addressing of a particularly designated character within a memory storage word utilizes a great portion of the word-addressing circuitry. The character addressing is similar to normal word addressing with the exception that:

1. The u-field of the instruction + $X_m$ portions of the specified index register are added to each other in addition to adding the word off-set $O_W$ portion of the specified J-Register: and
2. The storage limits checks is made on the absolute address determined after the addition of the word off-set value.

A memory reference is made for each character that is either to be read or stored.

Figure 13:
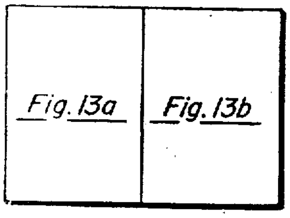
FIG. 13A and 13B when laid out as shown in FIG. 13 is a block diagram of the character addressing system of this invention.

The character addressing system is shown in block diagram form in FIG. 13. The circuitry illustrated is basically that included in the operand address formation and request generation, index incrementation, BS decision, and limits check circuitry of block 52 in FIG. 3. The system is illustrated in block diagram form, it being felt that a detailed circuit description would not tend to clarify the invention, and, instead, would tend to obfuscate the invention. The circuits identified in block form are readily understood, and the direction of signal flow, whether it be in a plurality of parallel conductors forming a cable, or whether it be a single conductor, are illustrated by lines having arrow heads showing the points of direction and circuit interconnection. It is also understood that registers that are illustrated are presumed to have been pre-loaded with appropriate data or instructions, and the detailed control circuitry is not shown.

The Processor State Register PSR, referred to generally by 100, includes the d-field 102 illustrated with D4 set, thereby indicating that the processor is in the character addressing mode. The I-area base address BI 104, the D-area base address BD 106, and the memory area pointer constant BS 108 are all included in the PSR. The instruction word is stored in the instruction register, referred to generally as 110.

Specific control pulses are not illustrated, since the specific control signals required will depend upon the specific circuit types utilized to implement the invention, and the control signal selection is well within the skill of logic designers. Instead, the timing intervals for each of the steps are illustrated generally for purposes of sequencing. No time scale is shown since the operating ranges of the various logic circuits which can be used to implement the invention will each require special timing considerations.

At the start of the character addressing operation, that is at time interval T1, the u-field of the instruction will pass on conductor 112 to Gate 114, and thence on cable 116 to Adder 1, labeled 118, and on calbe 120 to Adder 2, labeled 122. Adder 1 118 also receives the I-area base address BI on cable 124, and operates to perform the sum of $u$ + BI. Simultaneously, Adder 2 receives the D-area base address BD on cable 126, and forms the sum $u$ + BD.

The bits of the j-field are directed on cable 128 to the select $J_j$ circuitry 130. For the character addressing mode of operation, wherein the J-registers are to be utilized, the values of the j-field of 4, 5, 6, and 7, respectively select the J0-Register, the J1-Register, the J2-Register, and the J3-Register, as shown at block 132. The selection of the appropriate J-Register makes available the word off-set $O_w$ and the character off-set $O_b$.

The x-field of the instruction word 110 is transferred on cable 134 to the Select $X_x$ circuitry 136. The bit configuration of the x-field when translated, operates to select the appropriate one of the plurality of X-Registers 138. The selected X-Register has been preset to include the 18-bit index value $X_m$, and the increment value $X_i$.

The increment portion $X_m$ of the selected X-Register is passed on cable 140 to Gate 142, and on cable 144 to Gate 146. The u-field of the instruction word 110 is passed on cable 148 to Gate 150. During time interval T1, the increment value $X_m$ is passed through Gate 140 to cable 150 and thence through OR circuit 152 on cable 154 to Adder 5, labeled 156. Additionally, the value of the u-field is passed through Gate 150 on cable 158 to OR circuit 160 and thence on cable 162 to Adder 5. During time interval T1, Adder 5 forms the sum of $u = X_m$, with the sum passing on cable 164 to the sum register 166. The partial sum $u + X_m$ is saved in the sum register 166 for recycling during time interval T2 and addition to the word off-set value $O_w$.

During time interval T2, the value stored in the sum register 166 is passed on cable 168 through Gate 170 to cable 172 as an input to OR circuit 152, and thence on cable 154 as one set of inputs to Adder 5. The word off-set value $O_w$ is passed on cable 174 through Gate 176 on cable 178, and thence through OR circuits 160 over cable 162 as the other set of input signals for Adder 5. The function of Adder 5 on this cycle is to form the sum $(u+X_m)+O_w$, and the sum is transferred over cable 164 to the sum register 166. This completed sum is available on cable 180 to Gate 182 for use during time interval T3.

Also during time interval T2, the increment value $X_m$ is passed through Gate 146 on cable 184 to OR circuit 186 for supplying one set of input signals on cable 188 to Adder 3 190. At the same time, the increment value $X_m$ is supplied on cable 192 to OR circuit 194 as one set of input signals on cable 196 to Adder 4 198.

During time interval T2, the output sum of Adder 1 118 is passed over cable 200 through Gate 202 and over cable 204 as one set of input signals to OR circuit 206. These signals are passed as a second set of input signals over cable 208 to Adder 3. During time interval T2, then, Adder 3 forms the partial sum $(u + BI) + X_m$. In a similar manner, the sum signals provided by Adder 2 over cable 210 are passed through Gate 212, and then over cable 214 through OR circuits 216, and then through cable 218 as the second set of input signals to Adder 4. During time interval T2, Adder 4 functions to perform the partial sum, and forms $(u = BD) + X_m$.

During time interval T3, the word off-set value $O_w$ is combined with the partial sums in Adder 3 and Adder 4 to form a pair of absolute addresses that will be utilized in the selection of the actual absolute address desired. This is accomplished by the word off-set value $O_w$ being supplied on cable 220 to OR circuit 188, as one set of input signals to Adder 3 190. Adder 3 provides its partial sum on cable 222 through Gate 224 and over cable 226 to OR circuit 206, thereby providing the second set of input signals over cable 208 to Adder 3 190. The result of the second cycle of Adder 3 is to form the sum $[(u + BI) + X_m] + O_w$.

Adder 4 198 operates in a similar manner, and the word off-set $O_w$ is applied on cable 228 as a set of signals to OR circuit 194. The partial sum from Adder 4 198 passes over cable 230 through Gate 232, and is applied on cable 234 as a set of input signals to OR circuit 216. The function of Adder 4 during the second cycle is to form the sum $[(u + BD) + X_m] + O_w$.

Having generated two absolute memory addresses, it is necessary to select which of the two addresses will be used in the memory reference operation. This selection is accomplished during time interval T4, and at that time the memory area pointer constant BS directed on cable 240 to compare circuit 242 is compared to the sum that is stored in the sum register 166, and applied over cable 180 through Gate 182 and over cable 244 as the second set of input signals to compare circuit 242. Compare circuit 242 evaluates the signals applied, and provides an activating signal on line 246 when [BS] is equal to or greater than $[(u + X_m) + O_w]$. Compare circuit 242 operates to provide an enable signal on line 248 for the condition where [BS] is less than $[(u + X_m) + O_w]$. The sum from Adder 3 190 is applied over cable 250 to I-Gates 252, and when an activating signal is available on line 246, the absolute address generated by Adder 3 is passed on cable 254 to the address limits check circuitry 256 and on cable 258 to the address translation circuitry 260. Similarly, the absolute address generated by Adder 4 198 is passed on cable 262 to D-Gates 264, and when activated by a signal on line 248, is passed on cable 266 to the address limits check circuitry 256, and on cable 268 to the address translation circuitry 260. The address that is applied to the address translation circuitry 260, results in signals being passed either on cable 270 for selecting an absolute address in memory section D, or on cable 272 for selecting a memory address in memory section I. The address translation circuitry 260 is of a type well-known in the art, and there is separate translation and addressing circuitry for each of the memory modules. The address translation circuitry 260 in one characteristic form can be the diode matrix translation type. The address limits check circuitry 256 can be of a type described in the above referenced United States Patent of Duane H. Anderson.

Having referenced the appropriate address in the memory section 14, the read out circuitry 274 reads the accessed word over cable 276 to a holding register 278.

The actual selection of the character is accomplished during time interval T5, and the bits of the accessed word are directed over cable 280 to the select character gating circuitry 282. The actual gating selection of the desired character is performed by the character off-set bits $O_b$, as apply over cable 284 to the select character gating circuitry 282, and the control bits M and W applied over cable 286 to the select character gating circuitry. It will be recalled from a consideration of Table IV above, that the M bit specifies the mode, and when set to zero indicates a nine-bit mode, or when set to 1 indicates a six-bit mode. The W control bit specifies the width of the character, and when set to zero indicates either a six- or nine- bit character. When the W bit is a 1, the character will be either a 12- or 18- bit character. The combination of the M and W control bits specifies the size of the character. This combination can be more clearly seen in Table V.

TABLE V

| M | W | CHARACTER SIZE |
|---|---|---|
| 0 | 0 | 9-bits |
| 0 | 1 | 18-bits |
| 1 | 0 | 6-bits |
| 1 | 1 | 12-bits |

It will also be recalled from above, that the character off-set value $O_b$ is specially designated for each of the character sizes, as defined in FIGS. 9, 10, 11, and 12. The select character gating circuitry 282, operates in response to the character off-set value $O_b$ in conjunction with the control bits M and W to select the designated character, and provide it as an output over cable 290 for further use in the data processing system, as designated by the instruction in process.

During the reading of a character, the actual selected character determined by the Select Character circuitry 282 is automatically justified to the position adjacent the binary point. In this embodiment, the binary point is considered to be at the right side of the register, so there is automatically a right-justification of the character on cable 290 to the character register 292. Simultaneously with the determination of the right-justification, it is determined whether or not the sign will be extended. This sign extension is determined by the state of the E-bit of the selected J-Register. If the E-bit is zero, there will be no sign extension. If the E-bit is 1, the sign will be extended to fill the balance of the character register 292 that is not utilized to store the selected character. In order to accomplish the sign extension evaluation, the E-bit is directed over line 294 to the Select Character circuitry 282. The right-justification and the sign-fill operations for reading will be discussed in more detail below.

When the data processing system is in a mode of operation for writing a word in the memory, the particular character to be handled is stored in the Write Character register 296. The character to be written will be right-justified at that point in time. The character is passed over cable 298 to the Position Store circuitry 300. The Position Store circuitry is controlled by the state of the M and W bits as provided on line 302, and by the character off-set field $O_b$ provided on cable 304. The Position Store circuitry 300 then operates to properly orient the character that is to be written, and the positioned character is passed over cable 306 to the Write portion 308 of memory system 14. The calculation of the absolute memory address at which writing will take place is accomplished as described above. The writing positioning operation will be described in more detail below.

It can be seen from the foregoing detailed description, that the stated objective of providing a unique character addressing system in a word-oriented data processing system has been accomplished.

Figure 14:
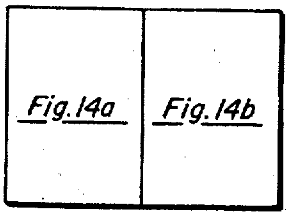
FIG. 14A and 14B when laid out as shown in FIG. 14 is a logical block diagram of the circuitry involved in reading a designated character, performing character justification, and selected sign extension.

The Select Character circuitry 282 is shown in logic diagram form in FIG. 14. Cables and portions of cables that are previously referenced will be identified by similar reference numerals where possible. The Accessed Word 278 is comprised of 36-bits, and character selection is available therefrom. In general, there are a plurality of groups of gates for the respective character sizes and positions, that are enabled in combination by a determination of the value of the M and W bits and an evaluation of the character off-set field $O_6$ having selected the appropriate gating combination, the character positions selected are directed right-justified to the character register 292, and an evaluation of the E-bit determines whether or not there will be sign-fill.

During the evaluation of M and W, when it is determined that the condition $\overline{M}\cdot W$ is met, circuitry 310 provides a signal on line 311 to activate the two sets of gates 312 and 313 for transferring half-word characters. When it is determined that the condition $M\cdot W$ exists, circuitry 314 provides a signal on line 315 for activating the sets of gates 316, 317, and 318, for transferring third-word characters. When the condition is determined to exist that $\overline{M}\cdot W$ exists, circuitry 319 provides a signal on line 320 for activating the sets of gates 321, 322, 323, and 324, for transferring quarter-word characters. Finally, when the condition $M\cdot W$ is found to exist, circuitry 325 provides a signal on line 326 for enabling the sets of gates 327, 328, 329, 330, 331, and 332 for passing the sixth-word characters.

The balance of the selection is determined by the state of the character offset field $O_6$, which is directed over cable 284 to the Translate $O_6$ circuitry 333. The Translate $O_6$ circuitry 333, operates to provide a discrete signal on one only of the plurality of output lines, the identification of that line being indicative of the numerical value of the character offset $O_6$ signals. For example, if $O_6$ is set equal to $000_2$, a signal will be applied on the zero output line 333–0. Similarly, if the $O_6$ field is set to $110_2$, a signal will be provided on the sixth output line 333–6. All other values of $O_6$ will be similarly translated, with the value 1 providing a signal on line 333–1, the value 2 providing a signal on line 333–2, the value 3 providing a signal on line 333–3, the value 4 providing a signal on line 333–4, and the value 5 providing a signal on line 333–5.

Each of the plurality of character gates shown, includes the bit position designation adjacent the input lines indicative of the bit positions read from the Accessed Word 278, and contains the number of bits transmitted adjacent the output lines.

For the half-word characters, the H1 gates 312 receive bits 18 through 35 on line 280–H1, and when a signal is provided on line 311 and on line 333–0, provides an 18-bit output on cable 290–H1 to the Character register 292. The H2 gates 313 receive bits 0 through 17 on cable 280–H2, and when an activating signal is available on line 311 and on line 333–4, passes an 18-bit character to cable 290–H2 for storage in the Character register 292.

For the third-word character size, the T1 gates 316 receive bits 24 through 35 on cable 280–T1, and when activated by a signal on line 315, and a signal on line 333–0, transfers a 12-bit character on line 290–T1 to the lower ordered 12-bit positions of the Character register 292. The T2 gares 317, receive bits 12 through 23 on cable 280–T2, and when an activating signal is provided on line 315, and on line 333–2, passes a 12-bit character on cable 290–T2. Similarly, the T3 gates 318 receive bit positions 0 through 11 over cable 280–T3, and when gated by an activating signal on line 315, and an activating signal on line 333–4, passes a 12-bit character to cable 290–T3.

The quarter-word characters are referred to as Q characters, and the Q1 gates 321 receive bits 27 through 35 over cable 280–Q1, and when activated by a signal on line 320, and on line 333–0, passes a nine-bit character to cable 290–Q1. The Q2 gates 322, receive bit positions 18 through 26 over cable 280–Q2, and when activated by a signal on line 320 and a signal on line 333–2, passes a nine-bit character to cable 290–Q2. The Q3 gates 323, receive bits 9 through 17 over cable 280–Q3, and when activated by a signal on line 320, and a signal on line 333–4, passes a nine-bit character to cable 290–Q3. Finally, the Q4 gates 324 receive bit position 0 through 8 over cable 280–Q4, and when activated by a signal on line 320 and a signal on line 333–6, provides a nine-bit character to cable 290–Q4.

The sixth-word characters are designated S, and the S1 gates 327 receive bits 30 through 35 over cable 280–S1, and when activated by a signal on line 326, and a signal on line 333–0, pass a six-bit character to cable 290–S1. The S2 gates 328, receive bits 24 through 29, and when activated by a signal on line 326 and a signal on line 333–1, pass a six-bit character to cable 290–S2. The S3 gates 329 receive bits 18 through 23 over cable 280–S3, and when activated by a signal on line 326 and a signal on line 333–2, pass a six-bit character to cable 290–S3. The S4 gates 330 receive bits 12 through 17 over cable 280–S4, and when activated by a signal on line 326 and a signal on line 333–3, pass a six-bit character to cable 290–S4. The S5 gates 331 receive bits 6 through 11 on cable 280–S5, and when activated by a signal on line 326 and a signal on line 333–4, operate to pass a six-bit character to cable 290–S5. Finally, the S6 gates 332 receive bits 0 through 5 on cable 280–S6, and when activated by a signal on line 326 and a signal on line 333–5, operate to pass a 6-bit character to cable 290–S6.

It will be seen that at any given time, one and only one of the plurality of gates described above, will be activated, thereby transmitting a single selected character of the size selected to the right-most portion of the Character register 292.

If the sign is not to be extended, the E-digit will be zero, and there will be a zero applied on line 294, and there will be no sign extension, and the balance of the Character register 292 not encompassed by the selected character will be zero. In the event that there is to be a sign extension, as indicated by E being set to 1, additional evaluation is necessary. This sign evaluation is accomplished by gates labeled 334, 335, 336, and 337. To evaluate the sign of half-word characters, bit position 17 is coupled through line 338 to gate 334, and the half-word character identifying signal is passed from circuitry 310 over line 311–S, to gate 334. The E signal is applied to gate 334 on line 294–H. Accordingly, if the eighteenth-bit is a 1, and gate 334 is selected, a 1 will be placed on line 339 for filling bit positions 18 through 35 of the Character register 292. In the event the eighteenth-bit of the character is a zero, a zero would be placed on line 339, and bit positions 18 through 35 would be set to zero.

The third-word character evaluation is accomplished by activation of line 315–S to gate 335, and when fully activated by a 1-bit applied on line 294–T, operates to pass the value of the bit position 11 over line 340 and on to line 341. Whether bit position 11 (the twelth-bit of the character) is 1 or 0, once passed through gate 335, it will be operative to set the appropriate state of bit positions 12 through 35 of the Character register 292.

The quarter-word characters are evaluated by gate 336. The eighth-bit position is transmitted over line 342 to gate 336, and when selected by a signal on line 320–S from the quarter-word selection circuitry 319, and a signal on line 294–Q indicating sign extension, will provide the sensed signal on line 343 to fill bit positions 9 through 35 of the Character register 292.

Finally, the quarter-word sign evaluation is accomplished by directing the fifth-bit position on line 334 to gate 337. When gate 337 is activated by a signal received on line 326–S from the quarter-word selection circuitry 325, and by the sign extension signal received on line 294–S, the sign signal will be passed on line 345 to fill bit positions 6 through 35 of the Character register 292.

Figure 15:
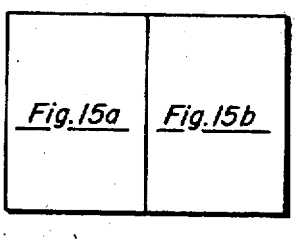
FIGS. 15A and 15B when laid out as shown in FIG. 15 is a logical block diagram of the circuitry utilized in positioning and recording a character.

Next directing attention to the positioning of a character prior to its storage, attention is directed to FIG. 15 wherein there is shown a logic block diagram of the Position Store circuitry referred to as block 300 in FIG. 13. As in the reading operation, the positioning for writing is under the control of the selected character size as well as the translation of the character offset signal $O_b$. The character offset is directed over cable 304 to the Translate $O_b$ circuitry 350, and operates to provide a unique signal on its output lines indicative of the numerical value of the character offset field $O_b$. The values of character offset signals result in a zero being provided on line 351–0, a 1 providing a signal on line 351–1, a 2 providing a signal on line 351–2, a 3 providing a signal on line 351–3, a 4 providing a signal on line 351–4, a 5 providing a signal on line 351–5, and a 6 providing a signal on line 351–6.

The character to be written will be provided right-justified in the Write-character register 296.

A plurality of gate circuits is provided for receiving the selected character sizes from the Write-character register 296, and directing the selected character to the appropriate position in the storage register 352. Each set of these gates is activated by the selection of the character size, and the character offset value $O_b$.

The selection of the half-word character size is accomplished by a determination that the relationship of the M and W bits is $\overline{M}\cdot W$, as determined by circuitry 353. An activating signal is provided on line 354 to the H1 gates 355 and the H2 gates 356.

The third-word character size is selected when the relationship $M\cdot W$ exists as determined by circuitry 358 providing a signal on line 359 to the T1 gates 360, the T2 gates 361, and the T3 gates 362.

The quarter-word character selection is accomplished when the relationship $\overline{M}\cdot\overline{W}$ circuitry 363 provides a signal on line 364 to the Q1 gates 365, the Q2 gates 366, the Q3 gates 367, and the Q4 gates 368.

Finally, the sixth word character size is selected when the relationship $M\cdot\overline{W}$ is sensed by circuitry 369, and a signal is provided on line 370 to the S1 gates 371, the S2 gates 372, the S3 gates 373, the S4 gates 374, the S5 gates 375, and the S6 gates 376.

As described above, each of the set of character selection gates receives the right-most bits designated adjacent the input lines, and positions their respective characters to the bit positions designated adjacent the output lines.

For the half-word characters, the H1 gates 355 receive 18-bits on cable 298–H1, and when activated by a signal on line 254, and a signal on line 351–0, passes the character to bit positions 18 through 35 over cable 306–H1. The H2 gates 356 operate to pass the 18-bits received on line 298–H2 when activated by a signal on line 354, and a signal on line 351–4, to pass the 18-bit character to bit positions 0 through 17 over cable 306–H2.

In the third-word selection mode, the T1 gates 360 receive 12-bits over cable 298–T1 and operates when activated by a signal on line 359, and a signal on line 351–0, to pass the character to bit positions 24 through 35 over cable 306–T1. The T1 gates 361 receive 12-bits over cable 298–T2, and when activated by a signal on line 359 and a signal on line 351–2, operates to transfer the 12-bit character to bit positions 12 through 23 over cable 306–T2. The T3 gates 362 receive 12-bits over cable 298–T3, and when activated by a signal on line 359, and a signal on line 351–4, operates to transfer a 12-bit character to bit positions 0 through 11 over cable 306–T3.

In the quarter-word mode, the Q1 gates 365 receive nine-bits over cable 298–Q1, and when activated by a signal on line 364 and a signal on line 351–0, operates to transfer the nine-bit character to bits 27 through 35 over cable 306–Q1. The Q2 gates 366 receive nine-bits over cable 298–Q2, and when activated by a signal on line 364 and a signal on line 351–2 operates to transfer the nine-bit character to bit positions 18 through 26 over cable 306–Q2. The Q3 gates 367 receive nine-bits over cable 298–Q3, and when activated by a signal on line 364, and a signal on line 351–4, operates to transfer the nine-bit character to bit positions 9 through 17 over cable 306–Q3. The Q4 gates 368 receive nine-bits over cable 298–Q4, and when activated by a signal on line 364 and a signal on line 351–6 operates to transfer the nine-bit character to bit positions 0 through 8 over cable 306–Q4.

The sixth-word format operates such that the S1 gates 371 receive six-bits over cable 298–S1, and when activated by a signal on line 370, and a signal on line 351–0, provide the six-bit character to bit positions 30 through 35 over cable 306–S1. The S2 gates 372 receives six-bits over cable 298–S2, and when activated by a signal on line 370 and a signal on line 351–1, operates to provide a six-bit character to bit positions 24 through 29 over cable 306–S2. The S3 gates 273 receoves six-bits over cable 298–S3, and when activated by a signal on line 370, and a signal on line 351–2, operates to provide a six-bit character to bit positions 18 through 23 over cable 306–S3. The S4 gates 374 receives six-bits over cable 298–S4, and when activated by a signal on line 370, and a signal on line 351-3, operates to provide a six-bit character to bit positions 12 through 17 over cable 306-S4. The S5 gates 375 receives six-bits over cable 298-S5, and when activated by a signal on line 370, and a signal on line 351-4, sends a six-bit character to bit positions 6 through 11 over cable 306-S5. Finally, the S6 gates 376 receives six-bits over cable298-S6, and when activated by a signal on line 370, and a signal to line 351-5, operates to send a 6-bit character to bit positions 0 through 5 over cable 306-S6.

In view of the foregiong detailed description of the character selection, right-justification of a selected character, the sign-fill selection during reading, and the positioning of a character for writing, it can be seen that the various stated objectives relating to character manipulation have been achieved.

In addition to the character addressing system described above, the present invention includes the capability of incrementing or decrementing character addresses for providing sequential or predetermined ordered reference to characters in accordance with the definition of the incrementing or decrementing control signals. The control of this incrementation of decrementation is accomplished by use of the h-bit within the instruction stored in the instruction register, and the state of the I-bit from the designated J-Register. Incrementation or decrementation can take place alternatively within the designated X-Register, or within the designated J-Register.

Figure 16:
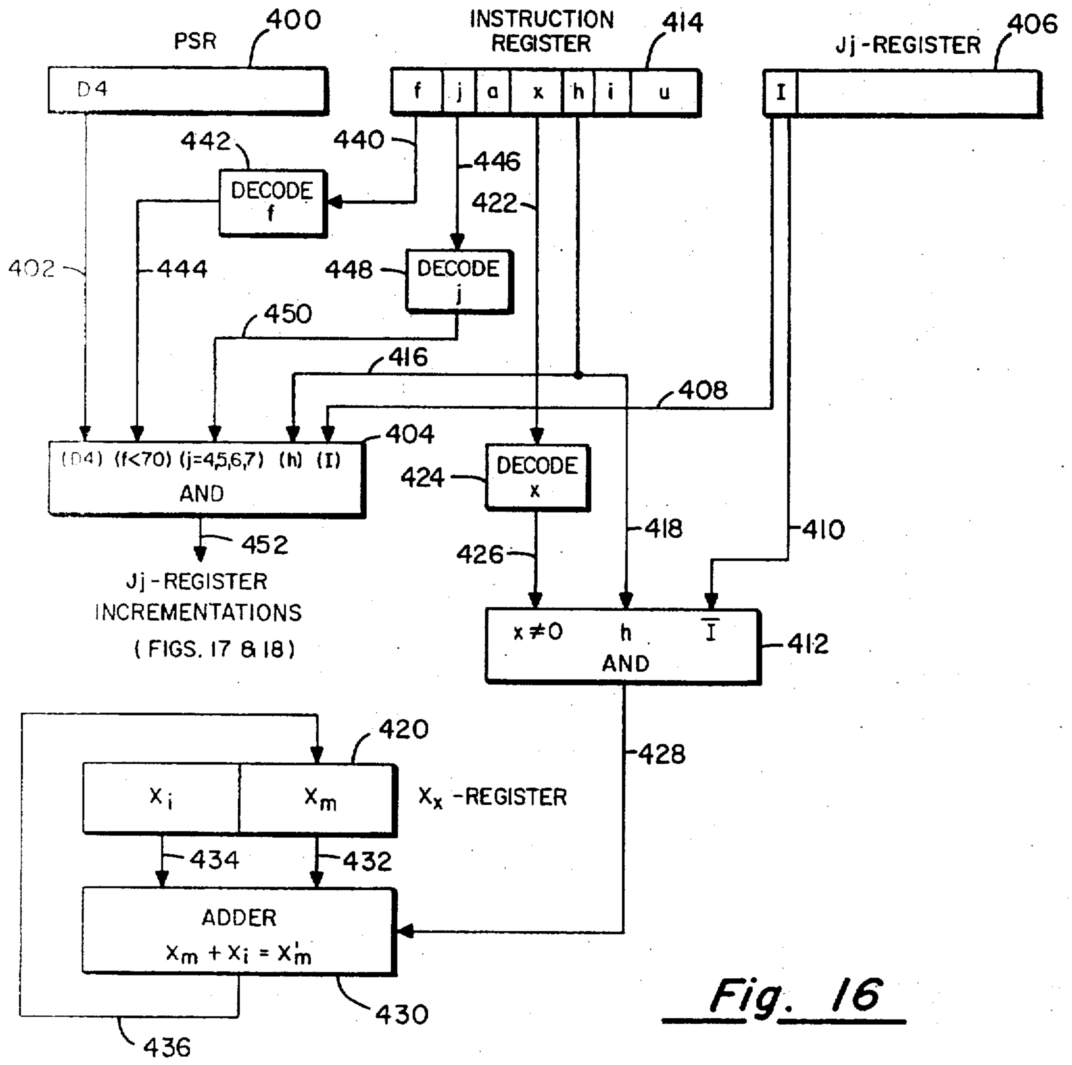
FIG. 16 is a block diagram illustrating the selection between the incrementation of the index register or the incrementation of the character addressing control register.

FIG. 16 is a block diagram that illustrates the selection requirements for character incrementation or decrementation. It is necessary at the outset that the digit D4 in the PSR 400 is set, and the signal level is passed over line 402 to AND circuit 404. When entering the character mode, PSR must be preset by an appropriate load instruction in order to precondition the D4-bit to the appropriate selection state. he designated $J_r$ Register 406 is also preloaded with the appropriate fields for the designated instruction that is to be performed, with the I-digit determining whether there will be incrementation within the $J_r$-Register or within the designated $X_r$-Register. For this embodiment, when the I-digit is a 1, a signal will be passed on line 408 as an input to AND circuit 404. In the event that the incrementation is to take place within the $X_r$-Register, the I-digit in J-Register 406 would be a 0, and the I signal would be passed on line 410 to AND circuit 412. These conditions are of course mutually exclusive, so that the I-digit will select between the two types of incrementation.

As described above, it is necessary that the H-bit within the instruction register 414 be set to a 1 for both types of incrementation. Accordingly, the H-bit is passed over line 416 to AND circuit 404 and over line 418 to AND circuit 412.

If there is to be incrementation of the $X_r$-Register 420, it is necessary that the x-field within instruction register 414 be other than zero. Accordingly, the x-field is directed over cable 422 to the Decode *x* circuitry 424. At this point, a test is made as to whether or not the x-field is zero, and in the event that it is other than zero, a signal is passed on line 426 6o AND circuit 412. Upon the occurrence of availability of activating signals on line 410 thereby indicating that the I-digit is zero, on line 418 indicating that the h-bit is set, and on line 426 indicating that the x-field is other than zero, AND circuit 412 will provide an activating signal on line 428 to Adder circuit 430. The 18-bit value of the index portion $X_m$ within $X_r$-Register 420 is passed over cable 432 as 1 set of inputs to Adder 430, and the increment value $X_i$ is passed over cable 434 as the other set of input signals to Adder 430. When Adder 430 is enabled by the signal on line 428, it operates to form the sum $X_m + X_i = X'_m$. This sum $X'_m$ is passed over cable 436 as an 18-bit value that is restored in the $X_m$ portion of the designated $X_r$-Register 420. This type of incrementation of the address stored in the selected index register $X_r$ will be accomplished for each instruction operation that designates this type of index incrementation. It is of course clear, that in order to perform decrementation, it is necessary only to have a negative value stored as the indexing portion $X_i$, so that when combined by Adder 430, there will be an effective decrementation rather than incrementation.

In the event that the incrementation is to take place in a designated J-Register, it is necessary that certain other conditions be met other than have been described. These additional conditions include a determination that the function code of the instruction, that is the x-field, is a value less than 70. This determination is accomplished by passing the f-field signals over cable 440 to the Decode *f* circuitry 442. This circuitry merely analyzes the digits of the f-fields, and determines whether or not the value is greater or less than 70. In the event that the f-field is less than 70, a signal is passed on line 444 to AND circuit 404.

If a designated J-Register is to be incremented, it is of course necessary that a particular J-Register be specified. In order to determine that an appropriate J-Register is specified, the j-field of the instruction register 414 is passed over cable 446 to the Decode *j* circuitry 448. For this embodiment, the special designations of the j-field that will indicate a $J_r$-Register for incrementation, must be set to a value of either 4, 5, 6 or 7. Any other j-field value will not operate the incrementation selection. Accordingly, the Decode *j* circuitry 448 is operative to provide a signal on line 450 to AND circuit 404 upon a determination that the j-field is of an appropriate value.

In summary, then, when AND circuit 404 receives a signal on line 402 that indicates that D4 is set in PSR, and receives a signal on line 408 that indicates that the I-digit in the J-Register 406 is set, and receives a signal on line 416 that indicates that the h-bit in the instruction register 414 is set, and receives a signal on line 444 indicating that the function code is less than 70, and receives a signal on line 450 that indicates that the j-field contains a value of either 4, 5, 6, or 7, it functions to provide an enabling signal on line 452 that will cause the $J_r$-Register to be incremented. The various types and configurations of J-Registr incrementation will be described below as they relate to the various character sizes that are permitted within the embodiment of this invention.

Incrementation of character position, that is, sequentially referencing the next succeeding character, or the next preceding character, requires the determination of an effective plus or minus 1 for the word index $I_w$ and the character index $I_b$ in the selected J-Register. When multiple character incrementation is desired, a preliminary determination must be made to determine the value to be set in the word increment field $I_w$ and the character index field $I_b$. Table VI sets forth the values that must be utilized for multiple character incrementation.

MULTIPLE CHARACTER INCREMENTATION

TABLE VI

| MW | EFFECTIVE | Iwb | Iw | Ib (EFFECTIVE ± 1) | BYTE SIZE |
|---|---|---|---|---|---|
| | + 1 | +1 | +0 | 1 | |
| 2 | − 1 | −1 | −0 | 6 | 6-BITS |
| | + 1 | +2 | +0 | 2 | |
| 0 | − 1 | −2 | −0 | 5 | 9-BITS |
| | − 1 | +2 | +0 | 2 | |
| 3 | − 1 | −2 | −0 | 5 | 12-BITS |
| | + 1 | +4 | +0 | 4 | |
| 1 | − 1 | −4 | −0 | 3 | 18-BITS |

A formula is used in the calculations for multiple character incrementation. To determine the value of the $I_w$-field, the number of characters to be processed is divided by the number Equation 1 below. The quotient of the division is utilized as the $I_w$-field. See Equation 2 below. The remainder of the division is utilized as the $I_b$-field. See Equation 3 below. When the direction of processing through the character string is from left to right, there is effective incrementation, and when the direction of processing through the character string is from right to left, it is necessary to complement both the $I_w$-field and the $I_b$-field for effective decrementation of characters.

| | | |
|---|---|---|
| FORMULA = | $Ct/(Cw*D)$ | (Equation 1) |
| | $Iw = Q$ | (Equation 2) |
| | $I_b = R \quad * E$ | (Equation 3) |

WHERE:

Ct = Total number of characters to increment/decrement.

Cw = Number of characters per word for this Byte size.

D = Direction (i.e., Left to Right for increment = +1; Right to Left for decrement = −1.)

Iw = J-Register bits 31–21.

Ib = J-Register bits 2φ–18.

Q = Quotient of the formula computation.

R = Remainder of the formula computation.

E1 = Effective ±1 according to D.

As described above, the I-bit of the selected J-Register enables J-Register incrementation of decrementation. The M and W bits specify which character size is to be used, and the E-bit specifies sign extension using the character mode in an instruction that specifies a register as the receiving field. In the word increment field $I_w$, bit position 31 is the sign bit where a value 1 specifies character processing to take place from right to left, and to obtain the desired processing movement from $I_{wb}$, the values must be complemented; and when bit position 31 has a value zero, character processing is from left to right, and the values of $I_w$ and $I_b$ are actual.

The basic incrementation operation is to add the word increment field $I_w$ to the word offset field $O_w$ and replace the word offset field with the new sum, and to add the character increment field $I_b$ to the character offset field $O_b$ and replace the character offset field with the new sum. Generally speaking, if a carry or borrow is generated as a result of adding the character increment field Ito the character offset field $O_b$, the carry or borrow is applied to the addition of the word increment field $I_w$ addition to the character offset field $O_w$. If the incrementation of $O_w$ causes the value to exceed all 1-bits, or decrementation of $O_w$ goes through all zero bits, there is a resultant error condition with results being undefined and in error.

Figure 17:
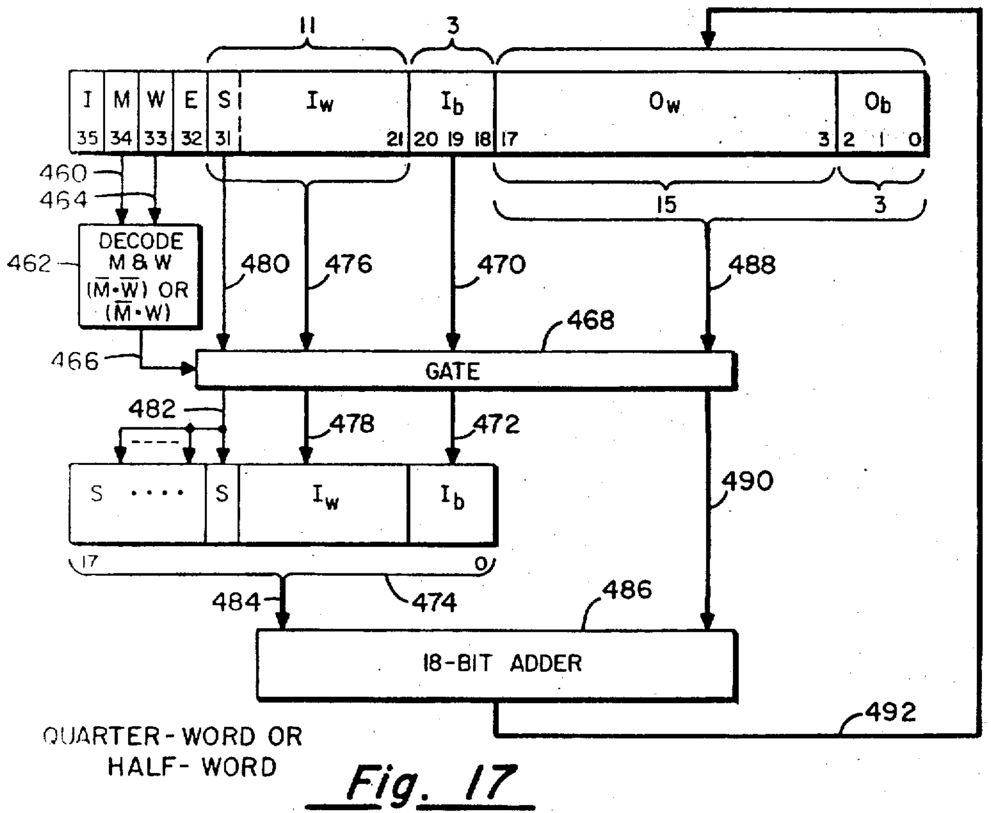
FIG. 17 is a block diagram of the quarter-word or half-word incrementation of the word offset and character offset values.

FIG. 17 is a logic block diagram illustrating the incrementation operation for quarter-word or half-word character sizes. The selected J-Register having been preconditioned, the M-digit is directed on line 460 to the Decode M and W circuitry 462, and the W-digit is directed on line 464 to the same circuitry. If it is determined that either both M and W are zero, thereby indicating a quarter-word character size, or M is zero and W is 1, thereby indicating the character size is a half-word, and enable signal passes on line 466 to Gates 468. The character increment $I_b$ passes over cable 470 through Gates 468 and through cable 472 to the $I_b$ portion of holding register 474. The word increment field $I_w$ passes over cable 476 through Gate circuits 468 and through cable 478 in to the $I_w$-field of holding register 474. The sign, that is digit position 31, passes over line 480 through Gate 468 and through conductors 482 to complete the sign-fill of holding register 474, thereby providing an 18-bit input over cable 484 to 18-bit Adder 486. The 18-bits comprised of the character offset $O_b$ and the word offset $O_w$ pass over cable 488 through Gates 468 and through cable 490 as the second set of input signals to the 18-bit Adder 486. The resultant sum passes over cable 492 as a replacement input for the $O_w$ and $O_b$ fields of the selected J-Register. This operation is repeated for each character that is sequentially referenced. Reference is directed to FIG. 9 for a determination of the allowable character offset $O_b$ values for half-word characters, and to FIG. 11 for permissible character offset $O_b$ values for quarter-word characters. Reference is made to Table VI for the required word increment $I_w$ and character increment $I_b$ values for either positive or negative incrementation.

Figure 18:
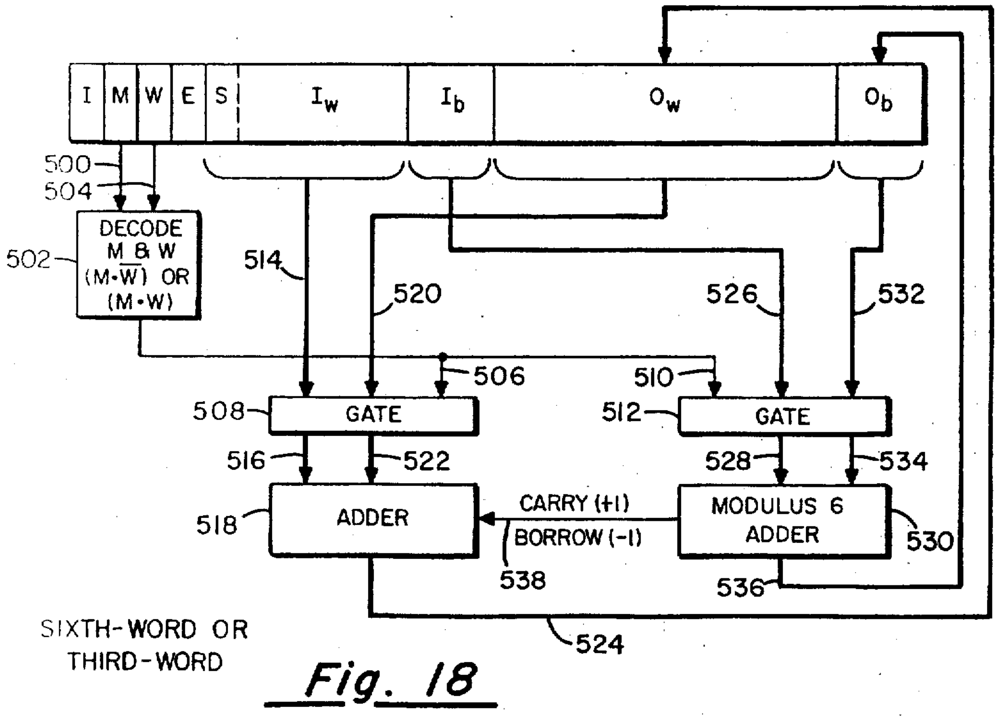
FIG. 18 is a block diagram of the sixth-word or third-word incrementation of the word offset field and character offset field.

The incrementation for character addressing for sixth-word or third-word character sizes differs somewhat from that of the quarter-word or half-word, and a block diagram illustrating the different handling is set forth in FIG. 18. Attention is directed to FIG. 10 where the character offset values are set forth for the third-word character format, and to FIG. 12 where the character offset values $O_b$ are set forth for the sixth-word character formats. It is because of the nature of the character offset $O_b$ values that are calculated at the end of a word, that it is necessary to have handling different from that for the quarter-word or half-word.

In a manner similar to that described above, the M-digit passes on line 500 to the Decoder M and W circuitry 502, and the W character passes on line 504. The Decode circuitry 502 operates to provide an activating output signal on line 506 to Gate 508 and on line 510 to Gate 512 when it is determined that the condition (M·W) or (M·W) exists. The word increment field $I_w$ with sign extended, as described above, passes on cable 514 as one set of input signals to Gate 508, and when activated, pass on cable 516 as one set of input signals to Adder 518. The word offset field $O_w$ passes on cable 520 to Gate 508, and when activated, is provided on cable 522 as the other set of input signals to Adder 518. Adder 518 is selected from Adders available in the art, and is basically a one's complements Adder, and oper- …es to provide the incremented value for the word off…t field $O_w$ on cable 524.

Additionally, the character increment field $I_b$ is …ssed on cable 526 to Gate 512, and when activated, …sses on cable 528 as one set of input signals to modu…s 6 Adder 530. The character offset field $O_b$ passes on …ble 532 to Gate 512, and when activated, passes on …ble 534 as the other set of input signals to modulus … Adder 530. The resultant incremented character off…t value $O_b$ passes on cable 536 back to the J-Register …eld.

The modulus 6 Adder 530 operates on the basis of a …ve's complement arithmetic system, and is necessary … keep the character offset field $O_b$ in proper se…uence.

When the modulus 6 Adder 530 is advanced to a …tate wherein a carry is generated, a signal passes on …ne 538 as an input to Adder 518, and the word offset …$_w$ is thereby increased to indicate that all of the char…cters is a designated word have been handled, and that …he next word is to be selected. When the system is op…rating in a decrementing mode, by the use of negative …alues, the signal on line 530 will be in essence a nega…ive 1 indicative of a borrow, and the word offset $O_w$ …vill be decreased by 1 at the completion of handling of …ll characters within the then active word.

Having described in detail the incrementing system, some examples will be provided to give numerical illustrations as to how the character addressing and incrementation is utilized.

Example I illustrates a character addressing and incrementation procedure wherein six-bit characters are sequentially referenced in sequential memory word locations. This illustrates incrementing both the character offset $O_b$ and the word offset $O_w$. The setting of the J-Register at its initial state, and the setting of the J-Register in its final state are illustrated. It is noted, that the increment and offset fields are shown numerically in the base 8, and the control digits are shown in binary for ease of bit representation. In Example I, the situation exists when the character offset $O_b$ reaches the limit of its permissible range, e.g. 5, it is necessary to correct the next sequential character offset to the zero value. This is accomplished as was described in conjunction with FIG. 18, by forcing a five's complement add to correct the new $O_b$, and to provide a carry into the word offset $O_w$ field. It can be seen that by the carry into the word offset field $O_w$, one address is caused to be skipped over. It is necessary that this be taken into account by the program user. This Example I is provided to show that care must be taken whenever the word increment $I_w$ field is greater than either plus or minus zero, as would be the more usual case.

EXAMPLE I

| | 0 | 1 | 2 | 3 | 4 | 5 | (Ob) |
|---|---|---|---|---|---|---|---|
| 03000 | CH1 | | | | | | |
| 03001 | | CH2 | | | | | |
| 03002 | | | CH3 | | | | |
| 03003 | | | | CH4 | | | |
| 03004 | | | | | CH5 | | |
| 03005 | | | | | | CH6 | |
| 03006 | | | | | | | |
| 03007 | CH7 | | | | | | |

J1 REGISTER INITIAL

| 35 | 34 33 | 32 | 21 | 18 | 3 | 0 |
|---|---|---|---|---|---|---|
| I | MW | E | Iw | Ib | Ow | Ob |
| 1 | 10 | 0 | 00001 | 1 | 00000 | 0 |

J1 REGISTER FINAL

| I | MW | E | Iw | Ib | Ow | Ob |
|---|---|---|---|---|---|---|
| 1 | 10 | 0 | 00001 | 1 | 00010 | 1 |

| | | | |
|---|---|---|---|
| | BI or BD + u + Xm = | U | |
| | 3000 | U - | |
| +0000 0 | | Ow/Ob | |
| | 3000 0 | CH1 ADDRESS | |
| | 0000 0 | Ow/Ob | |
| +0001 1 | | Iw/Ib | |
| | 0001 1 | NEXT Ow/Ob | |
| | Repeated Cycles | | |
| | 3001 1 | CH2 ADDRESS | |
| | 3002 2 | CH3 ADDRESS | |
| | 3003 3 | CH4 ADDRESS | |
| | 3004 4 | CH5 ADDRESS | |
| | 3000 | U | U |
| | +0005 | 5 | Ow/Ob |
| | 3005 | 5 | CH6 ADDRESS |
| | 0005 | 5 | Ow/Ob |
| | | 1 | Iw/Ib |
| 0001 | 0006 | 6 | FORCE 5's |
| | | 2 | Complement ADD |
| 0000 (SEE NOTE) | 0007 | 0 | Next O w/Ob |
| | 3000 | | U |
| | 0007 | 0 | Ow/Ob |
| | 3007 | 0 | CH7 ADDRESS |
| | 0007 | 0 | Ow/Ob |
| | 0001 | 1 | Iw/Ib |
| | 0010 | 1 | Next Ow/Ob |

NOTE
3006 NOT referenced due to Ob Wrap-around Carry bit adds to Ow and will skip over address 3006

In Example II, there is set forth a sequence that can be utilized when it is desired to search characters in memory for a particular designated character. By way of showing the sequental nature of the incrementation, the nine-bit characters have been shown stored starting in address 3001 in offset position 2, and continuing sequentially through addresses 3002 and 3003. In this Example, the word increment $I_w$ is selected as zero, and the character increment $I_b$ is selected as 2, thereby indicating a sequence through each accessed word. Initially, the word offset $O_w$ is zero, and since the first character is in the second offset position, the character offset $O_b$ is selected as 2. Assuming that the computer instruction has directed a search for the character E, the sequence of calculations set forth in Example II will the character E is found, the search operation terminates and no further incrementation or searching continues. It should be noted in Example II, that when the C character has been addressed, that the next sequential incrementation automatically steps the word offset $O_w$ by 1, and the character offset $O_b$ is reduced to zero, resulting from the carry through in the Adder.

In Example III there is shown a sequential character load, with one character being selected from each word. The character sizes in this Example are 12-bit, and illustrate that when the character offset $O_b$ is incremented to exceed the largest value permitted, that is $O_b$ = 4, a five's complement add is forced, as described in FIG. 18, resulting in a carry into the word offset $O_w$ field. Again this Example is provided to show the care that must be exercised by the user in selecting a word

EXAMPLE II

| | 0 | 2 | 4 | 6 |
|---|---|---|---|---|
| 03001 | | 'A' | 'B' | 'C' |
| 03002 | 'D' | 'E' | 'F' | 'G' |
| 03003 | 'H' | 'I' | 'J' | 'K' |

J REGISTER INITIAL

| 35 | 34 33 | 32 | 21 | 18 | | 3 0 |
|---|---|---|---|---|---|---|
| I | MW | E | Iw | Ib | Ow | Ob |
| I | 0 0 | 0 | 0 0 0 0 | 2 | 0 0 0 0 0 | 2 |

J REGISTER FINAL

| I | MW | E | Iw | Ib | Ow | Ob |
|---|---|---|---|---|---|---|
| I | 0 0 | 0 | 0 0 0 0 | 2 | 0 0 0 0 1 | 2 |

BI or BD + u + Xm = U

| | | |
|---|---|---|
| | 3001 | U |
| 0000 2 | | Ow/Ob |
| | 3001 2 | 'A' ADDRESS |
| | 0000 2 | Ow/Ob |
| 0000 2 | | Iw/Ib |
| | 0000 4 | NEXT Ow/Ob |
| | 3001 | U |
| 0000 4 | | Ow/Ob |
| | 3001 4 | 'B' ADDRESS |
| | 0000 4 | Ow/Ob |
| 0000 2 | | Iw/Ib |
| | 0000 6 | NEXT Ow/Ob |
| | 3001 | U |
| 0000 6 | | Ow/Ob |
| | 3001 6 | 'C' ADDRESS |
| | 0000 6 | Ow/Ob |
| 0000 2 | | Iw/Ib |
| | 0001 0 | NEXT Ow/Ob |
| | 3001 | U |
| 0001 0 | | Ow/Ob |
| | 3002 0 | 'D' ADDRESS |
| | 0001 0 | Ow/Ob |
| 0000 2 | | Iw/Ib |
| | 0001 2 | NEXT Ow/Ob |

SEARCH 'E' FOUND END INSTRUCTION illustrate the incrementation of the word offset $O_w$ and the character offset $O_b$ that is necessary for sequentially accessing each of the quarter-word characters. When increment $I_w$ value of other than zero, and while the results are predictable, they must be carefully taken into account in order to understand the operation.

EXAMPLE III

| | 0 | 2 | 4 |
|---|---|---|---|
| 03000 | | CH1 | |
| 03001 | | | CH2 |
| 03002 | | | |
| 03003 | CH3 | | |

J1 REGISTER INITIAL

| 35 | 34 33 | 32 | 21 | 18 | | 3 0 |
|---|---|---|---|---|---|---|
| I | MW | E | Iw | Ib | Ow | Ob |
| 1 | 1 1 | 0 | 0 0 0 1 | 2 | 0 0 0 0 0 | 2 |

J1 REGISTER FINAL

| I | MW | E | Iw | Ib | Ow | Ob |
|---|---|---|---|---|---|---|
| 1 | 1 1 | 0 | 0 0 0 1 | 2 | 0 0 0 0 4 | 2 |

BI or BD + u + Xm = U

| | | |
|---|---|---|
| | 3000 | U |
| | | Ow/Ob |
| 0000 2 | 3000 2 | CH1 ADDRESS |
| | 0000 2 | Ow/Ob |
| | | Iw/Ib |
| 0001 2 | 0001 4 | NEXT Ow/Ob |
| | 3000 | U |
| | | Ow/Ob |
| 0001 4 | 3001 4 | CH2 ADDRESS |
| | 0001 4 | O w/Ob |
| | | Iw/Ib |
| 0001 2 | 0002 6 | |
| | | 5's COMP ADD |
| 0000 2 | 0003 0 | NEXT Ow/Ob |

NOTE ADDRESS 3002 IS SKIPPED OVER

| | | |
|---|---|---|
| | 3000 | U |
| | | Ow/Ob |
| 0003 0 | 3003 0 | CH3 ADDRESS |
| | 0003 0 | Ow/Ob |
| | | Iw/Ib |
| 0001 2 | 0004 2 | NEXT Ow/Ob |

In Example IV, there is shown a searching operation wherein the 18-bit character ABC is being sought. In this Example, it will be noted that the word increment field is set to 2, thereby resulting in a character being selected for every two words of memory. It will also be noted that since the character ABC is stored in address 3004, that when the character offset $O_b$ reaches its maximum permissible value, that is 4, and is again incremented, it will cause a carry into the word offset field $O_w$, that will cause the character to be passed over and missed. It can be seen that in order to have a sequential searching of all 18-bit characters, it would be necessary to have the word increment field $I_w$ have a value of zero, and in that manner the search would be completed when the desired character was found.

EXAMPLE IV

| | 0 | 4 |
|---|---|---|
| 03000 | CH1 | |
| 03001 | | |
| 03002 | | CH2 |
| 03003 | | |
| 03004 | 'ABC' | |
| 03005 | CH3 | |

J1 REGISTER INITIAL

| I | MW | E | Iw | Ib | Ow | Ob |
|---|---|---|---|---|---|---|
| 1 | 0 1 | 0 | 0 0 0 2 | 4 | 0 0 0 0 0 | 0 |

J1 REGISTER FINAL

| I | MW | E | Iw | Ib | Ow | Ob |
|---|---|---|---|---|---|---|
| 1 | 0 1 | 0 | 0 0 0 2 | 4 | 0 0 0 0 7 | 4 |

BI or BD + Xm = U

| | | |
|---|---|---|
| | 3000 | U |
| | | Ow/Ob |
| 0000 0 | 3000 0 | CH1 ADDRESS |
| | 0000 0 | Ow/Ob |
| | | Iw/Ib |
| 0002 4 | 0002 4 | NEXT Ow/Ob |
| | 3000 | U |
| | | Ow/Ob |
| 0002 4 | 3002 4 | CH2 ADDRESS |
| | 0002 4 | Ow/Ob |
| | | Iw/Ib |
| 0002 4 | 0005 0 | NEXT Ow/Ob |

EXAMPLE IV – Continued

```
0005 0          3000        U
                            Ow/Ob
                3005 0      CH3 ADDRESS

                0005 0      Ow/Ob
0002 4                      Iw/Ib
                0007 4      NEXT Ow/Ob
         SEARCH 'ABC' NOT FOUND-END INSTRUCTION
```

In Example V there is shown a system for searching for a desired character, wherein decrementing is utilized, and the start of the search is designated to be the high address, and the high character offset $O_b$. In order to accomplish decrementation, for the quarter-word character size, the calculation illustrated in Example V is carried out, and the word increment $I_w$ and character increment $I_b$ are selected as shown. These values are a negative number, so that when added, effectively amount to a subtraction process. When decrementing, the E-bit is set for sign extension, and as stated, the $I_w$ and $I_b$ are negative. In Example V, a determination has been made to look at every third character, rather than every sequential character. It can be seen by adjustment of the initial state of the J-Register selected, that the various combinations for decrementing can also be achieved.

oriented memory addressing, but includes instructions for handling byte strings of characters.

CONCLUSION

In conclusion, then, it can be seen from the foregoing detailed description of the preferred embodiment that the various stated objectives of this invention have been achieved. An improved memory addressing system providing the capability of character addressing in a word-oriented data processor has been described. The character addressing system described provides the capability of addressing selective character sizes within the word-oriented memory register size. The improved character addressing system of this invention also has provided for automatically controlled incrementation or decrementation of character addressing in a word-oriented data processing system, and provides the accessed character in a justified position after

EXAMPLE V

| | 0 | 2 | 4 | 6 (Ob) |
|---|---|---|---|---|
| 03002 | — | 'C' | — | — |
| 03003 | 'B' | — | — | 'A' |

J1 REGISTER INITIAL

| I | MW | E | Iw | Ib | Ow | Ob |
|---|---|---|---|---|---|---|
| I | 00 | 1 | 3777 | 1 | 00003 | 6 |

J1 REGISTER FINAL

| I | MW | E | Iw | Ib | Ow | Ob |
|---|---|---|---|---|---|---|
| I | 00 | 1 | 3777 | 1 | 00001 | 4 |

```
                3000        U
                0003 6      Ow/Ob
                3003 6      'A' ADDRESS

                0003 6      Ow/Ob
7777 1                      Iw/Ib
                0002 7
      1       0             END Around Carry Bit (EAC)
                0003 0      Next Ow/Ob

                3000        U
0003 0                      Ow/Ob
                3003 0      'B' ADDRESS

TO Determine Iw Ib
   4 = Number of Characters
         in Word
   3 = Number of Characters
         to Increment
   2 = Sequential Count for
         9 Bit Mode
            0 Complement = 7
         4 3
            0
            3 × 2 = 6 Complement = 1

                0003 0      Ow/Ob
                7777 1      Iw/Ib
                0002 1
                     1      EAC Bit
                0002 2      NEXT Ow/Ob

                3000        U
                0002 2      Ow/Ob
                3002 2      'C' ADDRESS

                0002 2      Ow/Ob
                7777 1      Iw/Ib
                0001 3
                     1      EAC Bit
                0001 4      Next Ow/Ob
```

It is of course apparent, that the invention has utility and advantageous operation for partial-word handling of data within a word-oriented data processing system, and, additionally, has utility and advantageous operation in a data processing system that utilizes wordreadout, either with or without sign extension, and provides for the placement of a justified character is designated digit positions during a write operation.

It being recognized that there is modification of signal arrangements, circuitry selection, circuit arrangeient, timing conditions, data word size and format arangements, and control conditions, that will become pparent to those skilled in the art, without departing rom the spirit and scope of this invention, what is inended to be protected by Letters Patent is set forth in he appended claims.

We claim:

1. In a word-oriented data processing system having in addressable main memory device having a plurality of addressable storage locations, character addressing apparatus comprising: word-oriented memory addressing control means for accessing ones of the addressable storage locations character-addressing means coupled to said word-oriented addressing control means for selecting a predetermined one of a plurality of character sizes from one of a plurality of character locations in the accessed ones of said addressable storage locations and having character justification means for transferring and positioning selected characters to a justified location adjacent the binary point in a work-oriented system during character reading operations, and sign extension control means for selectively extending the sign of the accessed character to fill all digit positions of a word in said word-oriented system other than used for said character; and character-addressing control means coupled to said character-addressing means for selectively activating said character-addressing means for accessing said predetermined one character size.

2. Character addressing apparatus as in claim 1 wherein said character-addressing means includes character positioning means for positioning selected characters from a predetermined justified location adjacent the binary point in a word-oriented system to one of a plurality of character locations in said word-oriented system during writing operations.

3. Character addressing apparatus as in claim 1 wherein said character-addressing means includes character accessing incrementing means for accessing predetermined sequences of predetermined size characters in said addressable main memory device.

4. Character addressing apparatus as in claim 3 wherein said character addressing incrementing means includes word off-set means for determining the absolute address, in conjunction with the programmed address, of the word in said main memory device; character offset means for determining the character location of the selected character within said word; word increment means for incrementing said word offset means by a predetermined amount; and character increment means for altering said character offset means in a predetermined amount for accessing characters in a predetermined sequence.

5. Character addressing control apparatus for use with an addressable memory having a plurality of independently addressable storage registers for storing data and instruction word manifestations and having an instruction storage register with at least a portion thereof adapted for storing a base relative memory address to be accessed in the memory section, an indicator for indicating character indexing will be performed, said character addressing control apparatus comprising: word offset means for receiving signals indicative of a word offset; means for receiving signal manifestations indicative of a programmed base relative address for accessing a storage register; means for storing at least two selectively alterable base relative address constants and a memory area divider pointer address constant; first means for combining one of said base relative constants and the received programmed base relative address; second means operable substantially simultaneously with said first means for combining said second base relative address constants and the received programmed base relative address; control means for causing said first means and second means to combine said word offset signals with the respective results; selection means responsively coupled to said means for storing for evaluating said base relative address pointer constant for selective one of said sums as an alternative absolute memory address to be accessed in the addressable memory; memory accessing means for accessing said memory at said absolute address; and character offset means for receiving signals indicative of the character location in the word accessed by said absolute address; and character addressing means coupled to said character offset means for selecting the addressed character.

6. Character addressing control apparatus as in claim 5, and further including address incrementing means for incrementing the character addresses of sequences of characters to be accessed.

7. Character addressing control apparatus as in claim 6 wherein said address incrementing means includes word incrementing means coupled to said word offset means for incrementing said word offset signals by a predetermined amount, and character incrementing means coupled to said character offset means for incrementing said character offset signals by a predetermined amount.

8. Character addressing control apparatus as in claim 7 and further including character size control means coupled to said character addressing means for controlling the size of the character to be accessed.

9. Character addressing control apparatus as in claim 8 wherein said character addressing means includes character justification means for transferring and positioning selected characters to a predetermined justified position in a word-oriented system during reading of the addressed character.

10. Character addressing control apparatus as in claim 9, wherein said character addressing means further include sign extension control means for selectively extending the size of the accessed character to fill all digit positions of a word other than used for said character.

11. Character addressing control apparatus as in claim 7 wherein said character addressing means includes character size control means for providing signals indicative of the selected character size; character offset control means coupled to said character offset means for providing character offset control signals in response to said signals indicative of character location; a plurality of groups of character transfer gate means coupled to said character size control means and said character offset control means, each group of said plurality character transfer gate means for accessing a selected character, and each group of said character transfer gate means having input means coupled to receive predetermined digit combinations of the word accessed from said absolute address, each of said digit combinations comprising a predetermined character location, and output means for transferring the character signals selected to a predetermined justified position.

12. Character addressing control apparatus as in claim 11 and further including sign fill control means for selectively providing a signal fill control signal when sign fill is required; gate means coupled to said sign fill control means and responsively coupled to the sign signal in said character signals selected for sign filling all digit positions not utilized by said character signals.

13. Character addressing control apparatus as in claim 7 wherein said character addressing means includes write-character means for providing a character of a predetermined size to be stored in memory; character size control means for providing signals indicative of the selected character size; character off-set control means coupled to said character offset means for providing signals indicative of the character location within a word; a plurality of groups of character transfer gate means coupled to said character size control means and said character offset control means, each group of said character transfer gate means having input means coupled to receive predetermined digit combinations form said write-character means, and output means for transferring the character signals to a predetermined character offset position.

14. Character addressing control apparatus as in claim 8 wherein said address incrementing means includes word increment signal means for providing word increment signals indicative of a predetermined word increment to be utilized in altering said word offset signals; character increment signal means for providing character increment signals utilized to altering said character offset signals for providing an effective plus or minus one displacement of the next character address to be accessed; adder means for combining said word increment signals with said word offset signals and said character increment signals with said character offset signals for providing a new incremented character address.

15. Character addressing control apparatus as in claim 9 wherein said adder means includes signal transfer means for carrying an overflow signal that results when said combination of said word increment signals and said character offset signals passes through the maximum permissible value of character offset for a selected one of said character sizes, said signal transfer means coupled in said adder means for causing said overflow signal to be combined with said word increment signals and said word offset signals.

16. In a word-oriented computer system having an addressable main memory device having a plurality of independently addressable storage registers and control circuits for selectively performing word-oriented operations and character oriented operations, character addressing apparatus comprising: instruction register means with at least a first portion for storing base address signals a base relative memory address, a second portion for storing signals indicating one of a plurality of word address indexing registers, a third portion for storing signals indicating one of a plurality character addressing control registers, a fourth portion for storing increment control signals controlling incrementing of said address indexing registers and said character addressing control registers, and a fifth portion for storing operation code signals identifying the operation to be performed; base relative address means for storing signals indicative of at least first and second selectively alterable base address constants, a memory area divider constant and an operation control field including character mode selection; a plurality of index register means for storing signals indicative of word address index value; first and second adder means for forming first and second sums of said base relative memory address and said first and second base address constants; second and third adder means for forming third and fourth sums of said index value and said first and second sums; a plurality of character addressing control means, each having a first portion for storing character offset signals for locating a character within a word, a second portion for storing word offset signals for use in determining the absolute address of the word to be accessed, a third portion for storing character increment signals for use in modifying said character offset signals, a fourth portion for storing word increment signals for use in modifying said word offset signals, a fifth portion for storing sign extension control signals for controlling sign extension of accessed characters, a sixth portion for storing character size multiple control signals for selecting one of a plurality of base character sizes, a seventh portion for storing character mode control signals for selecting one of a plurality of multiples of said base character sizes, an eighth portion for storing indexing selection control signals for selecting indexing of said index register means and said character addressing control means; adder control means for causing said second and third adder means for forming fifth and sixth sums of said word offset signals and said fourth and fifth sums; fifth adder means for forming an intermediate sum of said base reltive address and said word address index value, if any; fifth address control means for causing said fifth adder means to a result sum of said intermediate sum and said word offset signals; absolute address selection means coupled to said memory area divider constant, said third, fourth, and fifth adder means for selecting an absolute memory address to access a word in the main memory device; accessed word storage means for storing a word read from said main memory device; character selection means coupled to said accessed word storage means, and said first, fifth, sixth and seventh portions of said character addressing control means for selecting and justifying the addressed character; character storage means for storing a predetermined justified character to be stored in said main memory device; character position means coupled to said character storage means and said first, fifth, sixth and seventh portions of said character addressing control means for positioning said justified character for writing in the character address indicated.

17. Character addressing apparatus as in claim 16 wherein said character selection means includes character size control means for providing signals indicative of the selected character size; character offset control means coupled to said character offset means for providing character offset control signals in response to said signals indicative of character location; a plurality of groups of character transfer gate means coupled to said character size control means and said character offset control means, each group of said plurality character transfer gate means for accessing a selected character, and each group of said character transfer gate means having input means coupled to receive predetermined digit combinations of the word accessed from said absolute address, each of said digit combinations comprising a predetermined character location, and output means for transferring the character signals selected to a predetermined justified position.

18. Character addressing apparatus as in claim 17 and further including sign fill control means for selectively providing a sign fill control signal when sign fill is required; gate means coupled to said sign fill control means and responsively coupled to the sign signal in said character signals selected for sign filling all digit positions not utilized by said character signals.

19. Character addressing apparatus as in claim 18 wherein said character positioning means includes a plurality of groups of character transfer gate means, each of said groups coupled to said character storage means and having output means for transferring said justified character to a predetermined character offset position for recording in said main memory device.

20. Character addressing apparatus as in claim 16 and further including character address incrementing means for incrementing the character address of sequences of characters to be accessed.

21. Character addressing apparatus as in claim 20 wherein said character addressing incrementing means includes character indexing control means responsive to said character mode selection, said operation code selection, said character addressing control register selection, said increment mode selection in said instruction and said increment selection in the selection one of said character addressing control registers, for selecting character address incrementation; adder means for forming the sum of said word increment signals and said word offset signals and the sum of said character increment signals and said character offset signals.

* * * * *

UNITED STATES PATENT OFFICE
CERTIFICATE OF CORRECTION

Patent No. 3,828,316 Dated August 6, 1974

Inventor(s) Charles D. Card et al.

It is certified that error appears in the above-identified patent and that said Letters Patent are hereby corrected as shown below:

Column 35, line 13, after "locations" insert a semi-colon; line 18, after "and" delete "having."; line 21, after "operations," delete "and" and insert -- having --; line 43, "off-set" should read -- offset --. Column 37, line 3, "signal", first occurrence, should read -- sign --; line 13, "off-set" should read -- offset --.

Signed and sealed this 3rd day of December 1974.

(SEAL)
Attest:

McCOY M. GIBSON JR.
Attesting Officer

C. MARSHALL DANN
Commissioner of Patents